US011784313B2

(12) United States Patent
Matsumura et al.

(10) Patent No.: US 11,784,313 B2
(45) Date of Patent: Oct. 10, 2023

(54) CONDUCTIVE MATERIAL PASTE COMPOSITION FOR SECONDARY BATTERY ELECTRODE, SLURRY COMPOSITION FOR SECONDARY BATTERY ELECTRODE, UNDERCOATING LAYER-EQUIPPED CURRENT COLLECTOR FOR SECONDARY BATTERY ELECTRODE, ELECTRODE FOR SECONDARY BATTERY, AND SECONDARY BATTERY

(71) Applicant: ZEON CORPORATION, Tokyo (JP)

(72) Inventors: Taku Matsumura, Tokyo (JP); Jun Mikami, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 182 days.

(21) Appl. No.: 15/762,202

(22) PCT Filed: Sep. 27, 2016

(86) PCT No.: PCT/JP2016/004359
§ 371 (c)(1),
(2) Date: Mar. 22, 2018

(87) PCT Pub. No.: WO2017/056488
PCT Pub. Date: Apr. 6, 2017

(65) Prior Publication Data
US 2018/0277848 A1 Sep. 27, 2018

(30) Foreign Application Priority Data

Sep. 30, 2015 (JP) .................................. 2015-194727

(51) Int. Cl.
| | |
|---|---|
| *H01M 4/62* | (2006.01) |
| *C08L 15/00* | (2006.01) |
| *H01M 4/13* | (2010.01) |
| *H01M 4/66* | (2006.01) |
| *H01M 4/139* | (2010.01) |
| *H01M 4/04* | (2006.01) |
| *H01M 4/1391* | (2010.01) |
| *C08L 27/16* | (2006.01) |
| *C08L 27/20* | (2006.01) |
| *C08L 47/00* | (2006.01) |
| *H01M 4/131* | (2010.01) |
| *H01M 10/0525* | (2010.01) |
| *H01M 4/02* | (2006.01) |

(52) U.S. Cl.
CPC ............. *H01M 4/625* (2013.01); *C08L 15/00* (2013.01); *C08L 27/16* (2013.01); *C08L 27/20* (2013.01); *C08L 47/00* (2013.01); *H01M 4/0404* (2013.01); *H01M 4/13* (2013.01); *H01M 4/131* (2013.01); *H01M 4/139* (2013.01); *H01M 4/1391* (2013.01); *H01M 4/622* (2013.01); *H01M 4/623* (2013.01); *H01M 4/667* (2013.01); *H01M 4/668* (2013.01); *H01M 10/0525* (2013.01); *H01M 2004/028* (2013.01)

(58) Field of Classification Search
CPC ...... H01M 4/625; H01M 4/0404; H01M 4/13; H01M 4/131; H01M 4/139; H01M 4/1391; H01M 4/622; H01M 4/623; H01M 4/667; H01M 4/668; H01M 10/0525; H01M 2004/028; C08L 15/00; C08L 27/16; C08L 47/00; C08L 27/20
USPC ....................................................... 429/217
See application file for complete search history.

(56) References Cited

U.S. PATENT DOCUMENTS

| | | | |
|---|---|---|---|
| 2006/0198422 A1* | 9/2006 | Chopra ................... | G02F 1/167 374/158 |
| 2013/0330622 A1 | 12/2013 | Sasaki et al. | |
| 2014/0121329 A1 | 5/2014 | Araki et al. | |
| 2015/0030922 A1* | 1/2015 | Kobayashi ............ | H01M 4/622 252/182.1 |
| 2015/0050554 A1 | 2/2015 | Fukumine et al. | |
| 2015/0050555 A1* | 2/2015 | Fukumine ............. | H01M 4/622 429/217 |
| 2015/0083975 A1 | 3/2015 | Yeou et al. | |
| 2016/0118665 A1* | 4/2016 | Sekine ................ | H01M 10/052 429/217 |

(Continued)

FOREIGN PATENT DOCUMENTS

| | | |
|---|---|---|
| CN | 102295898 A | 12/2011 |
| EP | 3348582 A1 | 7/2018 |

(Continued)

OTHER PUBLICATIONS

Apr. 3, 2018, International Preliminary Report on Patentability issued in the International Patent Application No. PCT/JP2016/004359.

(Continued)

*Primary Examiner* — Cynthia H Kelly
*Assistant Examiner* — Omar M Kekia
(74) *Attorney, Agent, or Firm* — KENJA IP LAW PC

(57) ABSTRACT

Provided is a slurry composition for a secondary battery electrode that has excellent fibrous carbon nanomaterial dispersibility and is capable of forming an electrode mixed material layer having excellent close adherence to a current collector. The slurry composition is obtained using a conductive material paste composition for a secondary battery electrode that contains a fibrous carbon nanomaterial, a binder, and a solvent. The binder includes a first copolymer that includes an alkylene structural unit and a nitrile group-containing monomer unit and has a weight average molecular weight of at least 170,000 and less than 1,500,000.

16 Claims, No Drawings

(56) References Cited

U.S. PATENT DOCUMENTS

| | | | |
|---|---|---|---|
| 2018/0159131 A1* | 6/2018 | Seol | H01M 4/623 |
| 2018/0269485 A1* | 9/2018 | Yoo | H01M 4/622 |

FOREIGN PATENT DOCUMENTS

| | | | | |
|---|---|---|---|---|
| JP | 2012204303 A | 10/2012 | | |
| JP | 2013008485 A | 1/2013 | | |
| JP | 2013218895 A | 10/2013 | | |
| JP | 2014203804 A | 10/2014 | | |
| WO | 2012115096 A1 | 8/2012 | | |
| WO | 2012165120 A1 | 12/2012 | | |
| WO | 2013080989 A1 | 6/2013 | | |
| WO | WO-2013084990 A1 * | 6/2013 | ......... | H01M 4/0404 |
| WO | WO-2013129658 A1 * | 9/2013 | ......... | H01M 10/052 |

OTHER PUBLICATIONS

Dec. 13, 2016, International Search Report issued in the International Patent Application No. PCT/JP2016/004359.

Mar. 7, 2019, the Extended European Search Report issued by the European Patent Office in the corresponding European Patent Application No. 16850667.3.

May 4, 2020, Communication pursuant to Article 94(3) EPC issued by the European Patent Office in the corresponding European Patent Application No. 16850667.3.

* cited by examiner

CONDUCTIVE MATERIAL PASTE COMPOSITION FOR SECONDARY BATTERY ELECTRODE, SLURRY COMPOSITION FOR SECONDARY BATTERY ELECTRODE, UNDERCOATING LAYER-EQUIPPED CURRENT COLLECTOR FOR SECONDARY BATTERY ELECTRODE, ELECTRODE FOR SECONDARY BATTERY, AND SECONDARY BATTERY

TECHNICAL FIELD

This disclosure relates to a conductive material paste composition for a secondary battery electrode, a slurry composition for a secondary battery electrode, an undercoating layer-equipped current collector for a secondary battery electrode, an electrode for a secondary battery, and a secondary battery.

BACKGROUND

Secondary batteries such as lithium ion secondary batteries have characteristics such as compact size, light weight, high energy-density, and the ability to be repeatedly charged and discharged, and are used in a wide range of applications. Therefore, studies have been carried out in recent years with the objective of further raising the performance of secondary batteries through improvement of electrodes and other battery components.

An electrode used in a secondary battery such as a lithium ion secondary battery normally includes a current collector and an electrode mixed material layer (positive electrode mixed material layer or negative electrode mixed material layer) formed on the current collector. An electrode mixed material layer, and particularly a positive electrode mixed material layer, may be formed by, for example, applying a slurry composition containing an electrode active material, a binder, a conductive material, and so forth onto a current collector, and then drying the applied slurry composition.

In recent years, attempts have been made to improve slurry compositions used in the formation of electrode mixed material layers in order to further improve secondary battery performance.

In one specific example, PTL 1 proposes a slurry composition that is produced by mixing, all at once in a solvent, a conductive additive (conductive material) composed of carbon nanotubes having specific properties, a binder composed of a hydrogenated diene copolymer including an α,β-ethylenically unsaturated nitrile monomer unit and having specific properties, an electrode active material, and so forth. In PTL 1, a lithium ion secondary battery having excellent battery performance is provided by using an electrode that is produced using the slurry composition prepared as described above.

CITATION LIST

Patent Literature

PTL 1: JP 2014-203804 A

SUMMARY

Technical Problem

A slurry composition used in formation of an electrode mixed material layer that contains a conductive material is required to have the conductive material favorably dispersed therein in order to enable formation of a good electrode mixed material layer in which electrical contact amongst an electrode active material is ensured and to further improve secondary battery performance.

However, in a situation in which a fibrous carbon nanomaterial is used as a conductive material, the fibrous carbon nanomaterial serving as the conductive material may aggregate because fibrous carbon nanomaterials such as carbon nanotubes normally have a high tendency to aggregate. Consequently, there have been cases in which it has not been possible to favorably disperse a fibrous carbon nanomaterial as a conductive material. For this reason, a conventional slurry composition containing a fibrous carbon nanomaterial may suffer from fibrous carbon nanomaterial aggregation and may not be able to favorably form an electrode mixed material layer.

Furthermore, an electrode mixed material layer formed using a slurry composition is normally required to have good close adherence to a current collector from a viewpoint of improving secondary battery performance. If close adherence between a current collector and an electrode mixed material layer is poor, the current collector and the electrode mixed material layer are not adequately bound to one another, which may result in deterioration of battery performance in terms of output characteristics and the like.

Therefore, there is demand for a slurry composition that contains a fibrous carbon nanomaterial such as carbon nanotubes to have the fibrous carbon nanomaterial favorably dispersed therein. Moreover, there is demand for good close adherence between a current collector and an electrode mixed material layer formed using the slurry composition in an electrode for a secondary battery.

Accordingly, one objective of this disclosure is to provide a fibrous carbon nanomaterial-containing slurry composition that has excellent fibrous carbon nanomaterial dispersibility and is capable of forming an electrode mixed material layer having excellent close adherence to a current collector.

Another objective of this disclosure is to provide an electrode for a secondary battery having excellent close adherence between a current collector and an electrode mixed material layer formed on the current collector.

Yet another objective of this disclosure is to provide a secondary battery having excellent battery characteristics.

Solution to Problem

The inventors conducted diligent investigation with the aim of solving the problems described above. Through this investigation, the inventors discovered that by producing a conductive material paste composition in which a fibrous carbon nanomaterial and a binder including a copolymer having a specific make-up and molecular weight are dispersed in a solvent, and by using the resultant conductive material paste composition to produce a slurry composition, the fibrous carbon nanomaterial can be favorably dispersed in the slurry composition. The inventors also discovered that an electrode mixed material layer formed using this slurry composition has excellent close adherence to a current collector.

Moreover, the inventors discovered that by forming a foundation layer (hereinafter, also referred to as an "undercoating layer") containing a fibrous carbon nanomaterial and a binder that includes a copolymer having a specific make-up and molecular weight on a current collector in production of an electrode for a secondary battery, adequate close adherence between the current collector and an electrode mixed material layer can be achieved.

The inventors completed the present disclosure based on these findings.

Specifically, this disclosure aims to advantageously solve the problems set forth above by disclosing a conductive material paste composition for a secondary battery electrode comprising: a fibrous carbon nanomaterial; a binder; and a solvent, wherein the binder includes a first copolymer including an alkylene structural unit and a nitrile group-containing monomer unit and having a weight average molecular weight of at least 170,000 and less than 1,500,000. As a result of the conductive material paste composition being produced using a fibrous carbon nanomaterial and a binder that includes a copolymer including an alkylene structural unit and a nitrile group-containing monomer unit and having a weight average molecular weight of at least 170,000 and less than 1,500,000, the fibrous carbon nanomaterial can be sufficiently dispersed in a slurry composition when the conductive material paste composition is used in production thereof. Moreover, excellent close adherence between a current collector and an electrode mixed material layer can be achieved in a situation in which the electrode mixed material layer is formed using this slurry composition.

In this disclosure, the "weight average molecular weight" can be measured as a value in terms of polystyrene by gel permeation chromatography (solvent: tetrahydrofuran).

In the presently disclosed conductive material paste composition for a secondary battery electrode, the binder preferably further includes a second copolymer including an alkylene structural unit and a nitrile group-containing monomer unit and having a weight average molecular weight of at least 10,000 and less than 170,000. As a result of the binder further including a second copolymer that includes an alkylene structural unit and a nitrile group-containing monomer unit and has a weight average molecular weight of at least 10,000 and less than 170,000, dispersibility of the fibrous carbon nanomaterial in a slurry composition produced using the conductive material paste composition containing this binder can be further improved.

In the presently disclosed conductive material paste composition for a secondary battery electrode, the second copolymer is preferably contained in a proportion of at least 0.5 mass % and less than 50 mass % relative to total content of the binder. As a result of the percentage content of the second copolymer being within the range set forth above, dispersibility of the fibrous carbon nanomaterial in a slurry composition produced using the conductive material paste composition can be further increased while also further improving close adherence between a current collector and an electrode mixed material layer that is produced using the slurry composition.

In the presently disclosed conductive material paste composition for a secondary battery electrode, the binder preferably further includes a fluorine-containing polymer. As a result of the binder further including a fluorine-containing polymer, it is possible to further improve the battery characteristics of a secondary battery including an electrode produced using a slurry composition that is produced using the conductive material paste composition containing this binder.

In the presently disclosed conductive material paste composition for a secondary battery electrode, the fibrous carbon nanomaterial is preferably one or more carbon nanotubes. The internal resistance of an obtained secondary battery can be reduced, and the secondary battery can be caused to display high output characteristics when carbon nanotubes are used as the fibrous carbon nanomaterial.

Moreover, this disclosure aims to advantageously solve the problems set forth above by disclosing a slurry composition for a secondary battery electrode comprising: an electrode active material; and any of the presently disclosed conductive material paste compositions for a secondary battery electrode set forth above. The slurry composition for a secondary battery electrode produced using the conductive material paste composition set forth above has excellent fibrous carbon nanomaterial dispersibility. Moreover, an electrode mixed material layer having excellent close adherence to a current collector can be formed using this slurry composition for a secondary battery electrode.

Furthermore, this disclosure aims to advantageously solve the problems set forth above by disclosing an electrode for a secondary battery comprising: a current collector; and an electrode mixed material layer formed using the presently disclosed slurry composition for a secondary battery electrode. Close adherence between the current collector and the electrode mixed material layer can be sufficiently improved when the presently disclosed slurry composition for a secondary battery electrode is used in this manner.

Also, this disclosure aims to advantageously solve the problems set forth above by disclosing a secondary battery comprising the presently disclosed electrode for a secondary battery. Battery characteristics can be sufficiently improved when the presently disclosed electrode for a secondary battery is used in this manner.

Moreover, this disclosure aims to advantageously solve the problems set forth above by disclosing an undercoating layer-equipped current collector for a secondary battery electrode comprising: a current collector; and an undercoating layer on at least one surface of the current collector, wherein the undercoating layer includes a fibrous carbon nanomaterial and a binder, and the binder includes a first copolymer including an alkylene structural unit and a nitrile group-containing monomer unit and having a weight average molecular weight of at least 170,000 and less than 1,500,000. By forming an undercoating layer that contains a fibrous carbon nanomaterial and a first copolymer having a specific make-up and molecular weight on a current collector, it is possible to provide an electrode for a secondary battery having increased close adherence between the current collector and an electrode mixed material layer formed on the current collector.

In the presently disclosed undercoating layer-equipped current collector for a secondary battery electrode, the binder preferably further includes a second copolymer including an alkylene structural unit and a nitrile group-containing monomer unit and having a weight average molecular weight of at least 10,000 and less than 170,000. As a result of the binder further including a second copolymer including an alkylene structural unit and a nitrile group-containing monomer unit and having a weight average molecular weight of at least 10,000 and less than 170,000, it is possible to obtain an undercoating layer-equipped current collector that can further improve close adherence between a current collector and an electrode mixed material layer formed on the current collector.

In the presently disclosed undercoating layer-equipped current collector for a secondary battery electrode, the second copolymer is preferably contained in a proportion of at least 0.5 mass % and less than 50 mass % relative to total content of the binder. As a result of the percentage content of the second copolymer being within the range set forth above, it is possible to obtain an undercoating layer-equipped current collector that can further improve close adherence between a current collector and an electrode mixed material layer formed on the current collector.

In the presently disclosed undercoating layer-equipped current collector for a secondary battery electrode, the fibrous carbon nanomaterial is preferably one or more carbon nanotubes. A secondary battery can be caused to display even better battery characteristics through use of an electrode including this undercoating layer-equipped current collector when carbon nanotubes are used as the fibrous carbon nanomaterial.

Advantageous Effect

According to this disclosure, it is possible to obtain a conductive material paste composition for a secondary battery electrode that can provide a slurry composition in which a fibrous carbon nanomaterial is favorably dispersed and with which an electrode mixed material layer having excellent close adherence to a current collector can be formed. Moreover, according to this disclosure, it is possible to provide a slurry composition for a secondary battery electrode in which a fibrous carbon nanomaterial is favorably dispersed and with which an electrode mixed material layer having excellent close adherence to a current collector can be formed.

Furthermore, according to this disclosure, it is possible to obtain an undercoating layer-equipped current collector for a secondary battery electrode that can provide an electrode for a secondary battery having excellent close adherence between a current collector and an electrode mixed material layer formed on the current collector. Also, according to this disclosure, it is possible to provide an electrode for a secondary battery having excellent close adherence between a current collector and an electrode mixed material layer formed on the current collector.

Moreover, according to this disclosure, it is possible to provide a secondary battery having sufficiently improved battery characteristics.

DETAILED DESCRIPTION

The following provides a detailed description of embodiments of the present disclosure.

The presently disclosed conductive material paste composition for a secondary battery electrode can be used in production of the presently disclosed slurry composition for a secondary battery electrode through mixing with an electrode active material. Moreover, the presently disclosed slurry composition for a secondary battery electrode produced using the presently disclosed conductive material paste composition for a secondary battery electrode can be used in production of the presently disclosed electrode for a secondary battery. Specifically, the presently disclosed electrode for a secondary battery includes, for example, a current collector and an electrode mixed material layer formed using the presently disclosed slurry composition for a secondary battery electrode.

The presently disclosed undercoating layer-equipped current collector for a secondary battery electrode includes a specific undercoating layer on the surface of a current collector and can be used as a substrate for formation of an electrode mixed material layer in production of an electrode. In other words, the undercoating layer according to this disclosure is provided on a current collector and underneath an electrode mixed material layer.

Moreover, the presently disclosed secondary battery can be obtained using the presently disclosed electrode for a secondary battery.

Note that the presently disclosed conductive material paste composition for a secondary battery electrode and slurry composition for a secondary battery electrode are particularly suitable for use in formation of a positive electrode of a secondary battery such as a lithium ion secondary battery.

(Conductive Material Paste Composition for Secondary Battery Electrode)

The presently disclosed conductive material paste composition for a secondary battery electrode contains a fibrous carbon nanomaterial, a binder, and a solvent. One feature of the binder contained in the presently disclosed conductive material paste composition for a secondary battery electrode is the inclusion of a first copolymer having a specific make-up and molecular weight. As a result of the presently disclosed conductive material paste composition for a secondary battery electrode containing a binder that includes the first copolymer having a specific make-up and molecular weight, a fibrous carbon nanomaterial used as a conductive material can be sufficiently dispersed in a slurry composition produced using the presently disclosed conductive material paste composition for a secondary battery electrode, and an electrode mixed material layer formed using this slurry composition can exhibit good close adherence to a current collector.

It should be noted that the presently disclosed conductive material paste composition for a secondary battery electrode may further contain conductive materials other than the fibrous carbon nanomaterial (hereinafter, also referred to as "other conductive materials") and other components as necessary.

<Binder>

In an electrode produced by forming an electrode mixed material layer on a current collector using a slurry composition produced using the conductive material paste composition, the binder is a component that can hold components contained in the electrode mixed material layer (for example, an electrode active material and a conductive material such as a fibrous carbon nanomaterial) to prevent detachment of these components from the electrode mixed material layer. Moreover, the binder is a component that can adhere the current collector and the electrode mixed material layer to one another with good peel strength and thereby increase close adherence of the electrode.

One feature of the binder contained in the presently disclosed conductive material paste composition for a secondary battery electrode is the inclusion of a first copolymer having a specific make-up and molecular weight. The binder contained in the presently disclosed conductive material paste composition for a secondary battery electrode may further contain polymers and/or copolymers other than the first copolymer.

[First Copolymer]

The first copolymer according to the present disclosure is required to include an alkylene structural unit and a nitrile group-containing monomer unit as repeating units, and may optionally further include repeating units other than the alkylene structural unit and the nitrile group-containing monomer unit (hereinafter, also referred to as "other repeating units").

As a result of the first copolymer including an alkylene structural unit and a nitrile group-containing monomer unit, the presently disclosed conductive material paste composition for a secondary battery electrode enables favorable dispersion of a fibrous carbon nanomaterial and can cause an electrode mixed material layer formed therewith to display excellent peel strength and flexibility. Consequently, a secondary battery having excellent battery characteristics such as output characteristics can be obtained.

As explained below, the first copolymer may include a fluorine-containing monomer unit as another repeating unit. However, the percentage content of this fluorine-containing monomer unit in the first copolymer is normally 30 mass % or less, and preferably 20 mass % or less, and thus the first copolymer differs from the subsequently described fluorine-containing polymer.

[[Alkylene Structural Unit]]

The alkylene structural unit is a repeating unit composed only of an alkylene structure represented by a general formula —$C_nH_{2n}$— (n is an integer of 2 or more). As a result of the first copolymer including the alkylene structural unit, when the first copolymer is used in a conductive material paste composition that is used in production of a slurry composition for a secondary battery electrode, dispersibility of a fibrous carbon nanomaterial can be improved and aggregation of the fibrous carbon nanomaterial in the slurry composition can be inhibited, which can increase dispersion stability of the slurry composition produced using the conductive material paste composition.

Although the alkylene structural unit may be linear or branched, the alkylene structural unit is preferably linear (i.e., the alkylene structural unit is preferably a linear alkylene structural unit) from a viewpoint of further improving dispersion stability of a slurry composition. Moreover, the carbon number of the alkylene structural unit is preferably 4 or more (i.e., n in the preceding general formula is preferably an integer of 4 or more) from a viewpoint of further improving dispersion stability of a slurry composition.

Examples of methods by which an alkylene structural unit can be introduced into a copolymer include, but are not specifically limited to, the following methods (1) and (2).

(1) A method involving producing a copolymer from a monomer composition containing a conjugated diene monomer, and hydrogenating the resultant copolymer to convert a conjugated diene monomer unit to an alkylene structural unit (2) A method involving producing a copolymer from a monomer composition containing a 1-olefin monomer Of these methods, method (1) is preferable in terms of ease of production of the first copolymer.

Examples of conjugated diene monomers that can be used include conjugated diene compounds having a carbon number of 4 or more such as 1,3-butadiene, isoprene, 2,3-dimethyl-1,3-butadiene, and 1,3-pentadiene. Of these conjugated diene monomers, 1,3-butadiene is preferable. In other words, the alkylene structural unit is preferably a structural unit obtained through hydrogenation of a conjugated diene monomer unit (i.e., the alkylene structural unit is preferably a hydrogenated conjugated diene unit), and is more preferably a structural unit obtained through hydrogenation of a 1,3-butadiene unit (i.e., the alkylene structural unit is more preferably a hydrogenated 1,3-butadiene unit). Selective hydrogenation of the conjugated diene monomer unit can be carried out by a commonly known method such as an oil-layer hydrogenation method or a water-layer hydrogenation method.

Examples of 1-olefin monomers that can be used include ethylene, propylene, 1-butene, and 1-hexene.

One of these conjugated diene monomers or 1-olefin monomers may be used individually, or two or more of these conjugated diene monomers or 1-olefin monomers may be used in combination.

The percentage content of the alkylene structural unit in the first copolymer when all repeating units (total of structural units and monomer units) in the first copolymer are taken to be 100 mass % is preferably 40 mass % or more, and more preferably 50 mass % or more, and is preferably 80 mass % or less, and more preferably 70 mass % or less. When the percentage content of the alkylene structural unit is set as at least any of the lower limits set forth above, fibrous carbon nanomaterial dispersibility in a slurry composition can be further improved, and slurry composition dispersion stability can be sufficiently increased. Moreover, when the percentage content of the alkylene structural unit is set as not more than any of the upper limits set forth above, reduction in solubility of the first copolymer in solvents such as N-methylpyrrolidone (NMP) can be inhibited, and the first copolymer can display a sufficient fibrous carbon nanomaterial dispersing effect.

In this disclosure, the "percentage content of an alkylene structural unit in a copolymer" can be measured by a nuclear magnetic resonance (NMR) method such as $^1$H-NMR.

[[Nitrile Group-Containing Monomer Unit]]

The nitrile group-containing monomer unit is a repeating unit that is derived from a nitrile group-containing monomer. The first copolymer can display excellent flexibility and binding force as a result of including the nitrile group-containing monomer unit. Consequently, an electrode mixed material layer that is formed using a slurry composition containing the presently disclosed conductive material paste composition for a secondary battery electrode can display excellent peel strength and flexibility.

Examples of nitrile group-containing monomers that can be used to form the nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these monomers, acrylonitrile and methacrylonitrile are preferable, and acrylonitrile is more preferable as a nitrile group-containing monomer from a viewpoint of increasing binding force of the first copolymer.

One of these nitrile group-containing monomers may be used individually, or two or more of these nitrile group-containing monomers may be used in combination.

The percentage content of the nitrile group-containing monomer unit in the first copolymer when all repeating units in the first copolymer are taken to be 100 mass % is preferably 10 mass % or more, more preferably 20 mass % or more, even more preferably 25 mass % or more, and particularly preferably 30 mass % or more, and is preferably 55 mass % or less, more preferably 50 mass % or less, and even more preferably 40 mass % or less. When the percentage content of the nitrile group-containing monomer unit in the first copolymer is set as at least any of the lower limits set forth above, binding force of the polymer can be improved, and peel strength of an electrode mixed material layer formed using a slurry composition that contains the conductive material paste composition can be sufficiently increased. Moreover, when the percentage content of the nitrile group-containing monomer unit in the first copolymer is set as not more than any of the upper limits set forth above, flexibility of the copolymer can be increased, which can maintain flexibility of an electrode mixed material layer formed using a slurry composition that contains the conductive material paste composition.

In this disclosure, the "percentage content of a nitrile group-containing monomer unit in a copolymer" can be measured by a nuclear magnetic resonance (NMR) method such as $^1$H-NMR.

[[Other Repeating Units]]

No specific limitations are placed on other repeating units that may be included besides the alkylene structural unit and the nitrile group-containing monomer unit described above. Examples of such other repeating units include repeating units derived from known monomers that are copolymerizable with the monomers described above, such as an acrylic acid ester monomer unit (for example, a butyl acrylate unit), a methacrylic acid ester monomer unit, a hydrophilic group-containing monomer unit, and a fluorine-containing monomer unit. Moreover, such other repeating units may include an aromatic vinyl monomer unit derived from an aromatic vinyl monomer such as styrene, α-methylstyrene, butoxystyrene, or vinylnaphthalene.

One of these monomers may be used individually, or two or more of these monomers may be used in combination.

The percentage content of such other repeating units in the first copolymer is preferably 25 mass % or less, more preferably 10 mass % or less, and even more preferably 1 mass % or less, and it is particularly preferable that the first copolymer does not include any of such other repeating units. In other words, the first copolymer is particularly preferably composed of only the alkylene structural unit and the nitrile group-containing monomer unit. This is because a fibrous carbon nanomaterial can be favorably dispersed when a first copolymer is used in which the percentage content of such other repeating units is small. Note that in a situation in which two or more types of other repeating units are included, the percentage content of other repeating units refers to the total of the percentage contents of these other repeating units.

[[Weight Average Molecular Weight]]

The first copolymer according to this disclosure is required to have a weight average molecular weight of at least 170,000 and less than 1,500,000. The weight average molecular weight of the first copolymer is preferably 200,000 or more, and more preferably 250,000 or more, and is preferably 1,200,000 or less, and more preferably 500,000 or less. When the conductive material paste composition is produced using a binder containing a first copolymer having a weight average molecular weight that is at least any of the lower limits set forth above, a slurry composition that is capable of producing an electrode having excellent peel strength can be obtained. Moreover, when the weight average molecular weight is not more than any of the upper limits set forth above, a fibrous carbon nanomaterial can be sufficiently dispersed, and a slurry composition that is capable of producing an electrode having flexibility can be obtained.

Note that the weight average molecular weight of the first copolymer is a value measured by gel permeation chromatography as mentioned above. The specific measurement method may be a method described in the EXAMPLES section of the present specification. Moreover, weight average molecular weights of the subsequently described second copolymer and fluorine-containing polymer can be measured by the same method as the weight average molecular weight of the first copolymer.

[[Iodine Value]]

The iodine value of the first copolymer is preferably 3 mg/100 mg or more, and more preferably 8 mg/100 mg or more, and is preferably 60 mg/100 mg or less, and more preferably 30 mg/100 mg or less. When the iodine value of the first copolymer is within any of the ranges set forth above, it is possible to provide a secondary battery having excellent battery characteristics because the copolymer is stable in terms of chemical structure at high potential and electrode structure can be maintained even during cycling over a long period.

The iodine value can be determined in accordance with JIS K6235; 2006.

[[Content]]

The content of the first copolymer in the conductive material paste composition in terms of mass relative to the content of the fibrous carbon nanomaterial in the conductive material paste composition is preferably 0.01 times the fibrous carbon nanomaterial content or more, more preferably 0.05 times the fibrous carbon nanomaterial content or more, and even more preferably 0.1 times the fibrous carbon nanomaterial content or more, and is preferably equal to or less than the fibrous carbon nanomaterial content, more preferably 0.8 times the fibrous carbon nanomaterial content or less, and even more preferably 0.4 times the fibrous carbon nanomaterial content or less. An electrode mixed material layer having high binding force can be formed when the first copolymer content is 0.01 times the fibrous carbon nanomaterial content or more, whereas a secondary battery in which internal resistance is suppressed can be produced when the first copolymer content is equal to or less than the fibrous carbon nanomaterial content.

[[Production Method of First Copolymer]]

Although no specific limitations are placed on the production method of the first copolymer set forth above, the first copolymer may be produced, for example, by using a polymerization initiator to polymerize a monomer composition containing the above-described monomers, optionally in the presence of a chain transfer agent, to obtain a copolymer, and then hydrogenating the resultant copolymer.

The mode of polymerization is not specifically limited and any of solution polymerization, suspension polymerization, bulk polymerization, and emulsion polymerization may be used, with emulsion polymerization being preferable. Also, any polymerization reaction can be used, such as ionic polymerization, radical polymerization, or living radical polymerization.

Furthermore, no specific limitations are placed on the method of polymer hydrogenation, and a normal method using a catalyst may be adopted (for example, refer to WO 2012/165120 A1, WO 2013/080989 A1, and JP 2013-8485 A).

The weight average molecular weight of the first copolymer can be adjusted without any specific limitations through, for example, the type and additive amount of chain transfer agent used in the polymerization reaction.

Examples of chain transfer agents that can be used include, but are not specifically limited to, alkyl mercaptans such as n-hexyl mercaptan, n-octyl mercaptan, t-octyl mercaptan, n-dodecyl mercaptan, t-dodecyl mercaptan, and n-stearyl mercaptan; xanthogen compounds such as dimethyl xanthogen disulfide and diisopropyl xanthogen disulfide; terpinolene; thiuram-based compounds such as tetramethylthiuram disulfide, tetraethylthiuram disulfide, and tetramethylthiuram monosulfide; phenol-based compounds such as 2,6-di-t-butyl-4-methylphenol and styrenated phenol; allyl compounds such as allyl alcohol; halogenated hydrocarbon compounds such as dichloromethane, dibromomethane, and carbon tetrabromide; thioglycolic acid; thiomalic acid; 2-ethylhexyl thioglycolate; diphenylethylene; and α-methylstyrene dimer. Of these chain transfer agents, alkyl mercaptans are preferable, and t-dodecyl mercaptan is more preferable from a viewpoint of inhibiting side reactions. One of these chain transfer agents may be used individually, or two or more of these chain transfer agents may be used in combination.

A known polymerization initiator such as sodium persulfate, ammonium persulfate, or potassium persulfate may be used, of which, ammonium persulfate is preferable.

Moreover, a known emulsifier such as an anionic surfactant, a nonionic surfactant, a cationic surfactant, or an ampholytic surfactant may be used without any specific limitations. For example, sodium alkylbenzenesulfonate may be used as the emulsifier.

[(Co)Polymers Other than First Copolymer]

The binder may further contain polymers and/or copolymers other than the first copolymer. These polymers and/or copolymers may be known polymers that can be used as binders. From a viewpoint of further increasing fibrous carbon nanomaterial dispersibility in a slurry composition while also further increasing close adherence between a current collector and an electrode mixed material layer formed using the slurry composition, it is preferable that, from among such other polymers and copolymers, the binder further includes either or both of a fluorine-containing polymer and a second copolymer that includes an alkylene structural unit and a nitrile group-containing monomer unit and has a weight average molecular weight of at least 10,000 and less than 170,000, and more preferable that the binder includes both the fluorine-containing polymer and the second copolymer.

Polymers and copolymers other than the second copolymer and the fluorine-containing polymer can be used without any specific limitations other than being typical polymers and copolymers that can function as a binder in conjunction with the above-described first copolymer and the like. Examples include polyacrylonitrile, polymethyl methacrylate, and the like.

[[Second Copolymer]]

The second copolymer that may optionally be used as the binder includes an alkylene structural unit and a nitrile group-containing monomer unit as repeating units, and may optionally further include repeating units other than the alkylene structural unit and the nitrile group-containing monomer unit (hereinafter, also referred to as "other repeating units").

When the second copolymer is used in combination with the first copolymer as the binder, the fibrous carbon nanomaterial can be more favorably dispersed, and an electrode mixed material layer formed using the conductive material paste composition can be caused to display even better peel strength and flexibility as a result of the second copolymer including an alkylene structural unit and a nitrile group-containing monomer unit.

—Alkylene Structural Unit—

The alkylene structural unit is a repeating unit composed only of an alkylene structure represented by a general formula $—C_nH_{2n}—$ (n is an integer of 2 or more) in the same way as for the previously described first copolymer. When the second copolymer is used in production of a conductive material paste composition that is used to produce a slurry composition for a secondary battery electrode, fibrous carbon nanomaterial dispersibility can be improved, fibrous carbon nanomaterial aggregation in the slurry composition can be inhibited, and dispersion stability of the slurry composition produced using the conductive material paste composition can be increased as a result of the second copolymer including the alkylene structural unit.

Note that the preferred form, content, and method of introduction of the alkylene structural unit in the second copolymer are the same as for the first copolymer.

—Nitrile Group-Containing Monomer Unit—

The nitrile group-containing monomer unit is a repeating unit that is derived from a nitrile group-containing monomer. The second copolymer can display excellent flexibility and binding force as a result of including the nitrile group-containing monomer unit. Consequently, an electrode mixed material layer that is formed using a slurry composition containing the conductive material paste composition for a secondary battery electrode that contains this second copolymer can display excellent peel strength and flexibility.

Examples of nitrile group-containing monomers that can be used to form the nitrile group-containing monomer unit in the second copolymer include the same nitrile group-containing monomers as for the first copolymer. Of these nitrile group-containing monomers, acrylonitrile is preferable.

Moreover, the preferred percentage content of the nitrile group-containing monomer unit is also the same as for the first copolymer.

—Other Repeating Units—

Examples of other repeating units that can be included in the second copolymer include the same other repeating units as can be included in the first copolymer. The preferred content of these other repeating units is also the same as for the first copolymer.

—Weight Average Molecular Weight—

The optionally used second copolymer has a weight average molecular weight of at least 10,000 and less than 170,000. The weight average molecular weight of the second copolymer is preferably 15,000 or more, more preferably 20,000 or more, and even more preferably 30,000 or more, and is preferably 140,000 or less, and more preferably 100,000 or less. By using a conductive material paste composition that is produced using a binder that further contains a second copolymer having a weight average molecular weight within any of the ranges set forth above, it is possible to obtain a slurry composition in which the fibrous carbon nanomaterial is more favorably dispersed, and also to maintain the peel strength and flexibility of an electrode produced using this slurry composition.

—Iodine Value—

The iodine value of the second copolymer is preferably 3 mg/100 mg or more, and more preferably 8 mg/100 mg or more, and is preferably 60 mg/100 mg or less, and more preferably 30 mg/100 mg or less. A secondary battery having excellent battery characteristics can be provided when the iodine value of the second copolymer is within any of the ranges set forth above because the copolymer is stable in terms of chemical structure at high potential and electrode structure can be maintained even during cycling over a long period.

The iodine value can be determined in accordance with JIS K6235; 2006.

—Content—

The content of the second copolymer in the conductive material paste composition in terms of mass relative to the content of the fibrous carbon nanomaterial is preferably 0.001 times the fibrous carbon nanomaterial content or more, more preferably 0.005 times the fibrous carbon nanomaterial content or more, and even more preferably 0.02 times the fibrous carbon nanomaterial content or more, and is preferably 0.8 times the fibrous carbon nanomaterial content or less, more preferably 0.6 times the fibrous carbon nanomaterial content or less, even more preferably 0.09 times the fibrous carbon nanomaterial content or less, further preferably 0.06 times the fibrous carbon nanomaterial content or less, and particularly preferably 0.04 times the fibrous carbon nanomaterial content or less. Fibrous carbon nanomaterial dispersibility in the conductive material paste composition and a slurry composition can be further increased, and internal resistance of a secondary battery can be suppressed when the content of the second copolymer is within any of the ranges set forth above.

Moreover, the proportion constituted by the second copolymer in the conductive material paste composition relative to the total content of the binder in the conductive material paste composition is preferably 0.5 mass % or more, more preferably 1 mass % or more, even more preferably 2 mass % or more, further preferably 10 mass % or more, and particularly preferably 12 mass % or more, and is preferably less than 50 mass %, more preferably less than 30 mass %, and even more preferably less than 20 mass %. Fibrous carbon nanomaterial dispersibility in a slurry composition containing the conductive material paste composition is even better, and peel strength of an electrode produced using this slurry composition is sufficiently high when the percentage content of the second copolymer relative to the total content of the binder is within any of the ranges set forth above.

—Production Method of Second Copolymer—

The second copolymer can be produced in the same manner as the previously described first copolymer without any specific limitations.

[[Fluorine-Containing Polymer]]

The fluorine-containing polymer may optionally be used as the binder is a polymer including a fluorine-containing monomer unit. Specifically, the fluorine-containing polymer may be a homopolymer or copolymer of one or more fluorine-containing monomers. Moreover, the fluorine-containing polymer may be a composite polymer (for example, a polymer having a core-shell structure) obtained through compositing with a polymer that does not contain fluorine.

From a viewpoint of achieving good dispersibility of a slurry composition and good close adherence of an electrode, the fluorine-containing polymer is preferably a homopolymer or copolymer of one or more fluorine-containing monomers and is preferably not composited.

Examples of homopolymers and copolymers of one or more fluorine-containing monomers include, but are not specifically limited to, polytetrafluoroethylene, polychlorotrifluoroethylene, polyvinylidene fluoride, polyvinyl fluoride, perfluoroalkoxy fluororesin, and tetrafluoroethylene-hexafluoropropylene copolymer. Of these homopolymers and copolymers, polyvinylidene fluoride (PVdF) is preferable.

Examples of commercially available PVdF include W #7500 (molecular weight: 630,000) and W #9300 (molecular weight: 1,200,000) produced by Kureha Corporation, and Solef® (Solef is a registered trademark in Japan, other countries, or both) 5130 (molecular weight: 500,000) produced by Solvay.

A composite polymer that is a composite with a polymer that does not contain fluorine can be produced by multi-step polymerization, for example. Specifically, the composite polymer can be produced by, for example, performing polymerization of a fluorine-containing monomer and then performing polymerization of a freely selected monomer that does not contain fluorine (non-fluorine-containing monomer), such as listed below, in the same system.

Examples of non-fluorine-containing monomers that can be used include:
alkene monomers such as ethylene and propylene;
(meth)acrylic acid ester monomers such as alkyl esters of acrylic acid (for example, methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, and 2-ethylhexyl acrylate) and alkyl esters of methacrylic acid (for example, methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, and 2-ethylhexyl methacrylate);
styrene-based monomers such as styrene, chlorostyrene, vinyltoluene, t-butylstyrene, methyl vinylbenzoate, vinylnaphthalene, chloromethylstyrene, α-methylstyrene, and divinylbenzene;
ethylenically unsaturated carboxylic acid monomers such as ethylenically unsaturated monocarboxylic acids (for example, acrylic acid, methacrylic acid, and crotonic acid), derivatives of ethylenically unsaturated monocarboxylic acids (for example, 2-ethylacrylic acid, isocrotonic acid, α-acetoxyacrylic acid, β-trans-aryloxyacrylic acid, α-chloro-β-E-methoxyacrylic acid, and β-diaminoacrylic acid), ethylenically unsaturated dicarboxylic acids (for example, maleic acid, fumaric acid, and itaconic acid); acid anhydrides of ethylenically unsaturated dicarboxylic acids (for example, maleic anhydride, diacrylic anhydride, methyl maleic anhydride, and dimethyl maleic anhydride); and derivatives of ethylenically unsaturated dicarboxylic acids (for example, methylmaleic acid, phenylmaleic acid, chloromaleic acid, dichloromaleic acid, and fluoromaleic acid); and
crosslinking monomers (crosslinkable monomers) other than those listed above such as glycidyl methacrylate, allyl glycidyl ether, allyl (meth)acrylate, and N-methylolacrylamide.

In the present specification, "(meth)acrylate" is used to indicate "acrylate" and/or "methacrylate".

The proportion constituted by fluorine-containing monomer units in the fluorine-containing polymer is normally 70 mass % or more, and preferably 80 mass % or more. Moreover, the proportion constituted by non-fluorine-containing monomer units in the fluorine-containing polymer is normally 30 mass % or less, and preferably 20 mass % or less.

—Weight Average Molecular Weight—

Although no specific limitations are placed on the weight average molecular weight of the fluorine-containing polymer, the weight average molecular weight is preferably 170,000 or more, more preferably 200,000 or more, and even more preferably 250,000 or more, and is preferably 1,500,000 or less, more preferably 1,200,000 or less, and even more preferably 1,100,000 or less. An electrode having excellent peel strength can be produced by using a binder that further includes a fluorine-containing polymer having a weight average molecular weight that is at least any of the lower limits set forth above. Moreover, an electrode having excellent flexibility can be produced when the weight average molecular weight is not more than any of the upper limits set forth above.

—Content—

The content of the fluorine-containing polymer in terms of mass relative to the content of the fibrous carbon nanomaterial is preferably 0.01 times the fibrous carbon nanomaterial content or more, more preferably 0.05 times the fibrous carbon nanomaterial content or more, and even more preferably 0.1 times the fibrous carbon nanomaterial content or more, and is preferably 0.9 times the fibrous carbon nanomaterial content or less, more preferably 0.7 times the fibrous carbon nanomaterial content or less, and even more preferably 0.3 times the fibrous carbon nanomaterial content or less. An electrode mixed material layer having high binding force can be obtained when the fluorine-containing polymer content is 0.01 times the fibrous carbon nanomaterial content or more. Moreover, internal resistance of a secondary battery can be suppressed when the fluorine-containing polymer content is 0.9 times the fibrous carbon nanomaterial content or less.

[Binder Content]

The content of the entire binder in the conductive material paste composition in terms of mass relative to the content of the fibrous carbon nanomaterial in the conductive material paste composition, for example, is preferably 0.01 times the fibrous carbon nanomaterial content or more, more preferably 0.05 times the fibrous carbon nanomaterial content or more, even more preferably 0.1 times the fibrous carbon nanomaterial content or more, further preferably 0.15 times the fibrous carbon nanomaterial content or more, and particularly preferably 0.2 times the fibrous carbon nanomaterial content or more, and is preferably equal to or less than the fibrous carbon nanomaterial content, more preferably 0.8 times the fibrous carbon nanomaterial content or less, and even more preferably 0.4 times the fibrous carbon nanomaterial content or less. When the content of the entire binder is at least any of the lower limits set forth above, an electrode having good close adherence can be produced using an electrode mixed material layer having raised binding force. Moreover, when the content of the entire binder is not more than any of the upper limits set forth above, a fibrous carbon nanomaterial can be favorably dispersed in a slurry composition containing the binder, and internal resistance of a secondary battery produced using this slurry composition can be suppressed.

<Fibrous Carbon Nanomaterial>

The fibrous carbon nanomaterial according to this disclosure is used as a conductive material for ensuring electrical contact amongst an electrode active material in an electrode mixed material layer. Examples of fibrous carbon nanomaterials that can be used include, but are not specifically limited to, single-walled and multi-walled carbon nanotubes, carbon nanohorns, nanosized vapor-grown carbon fiber, and nanosized carbon fiber obtained through carbonization and pulverization of organic fiber. One of these fibrous carbon nanomaterials may be used individually, or two or more of these fibrous carbon nanomaterials may be used in combination.

Of these fibrous carbon nanomaterials, the use of one or more carbon nanotubes (hereinafter, also referred to as "CNTs") is preferable in terms that carbon nanotubes have high conductivity and chemical stability, and enable reduction of the resistance of an electrode mixed material layer formed using a slurry composition and production of a secondary battery having excellent output characteristics.

Examples of CNTs that may suitably be used as the fibrous carbon nanomaterial include CNTs used by themselves and CNTs used with another fibrous carbon nanomaterial as a mixture (i.e., a CNT-containing fibrous carbon nanomaterial).

Note that a conductive material formed from a fibrous carbon nanomaterial normally tends to aggregate and is difficult to disperse. However, as a result of the presently disclosed conductive material paste composition for a secondary battery electrode used in the production of the presently disclosed slurry composition for a secondary battery electrode containing a binder that includes the previously described first copolymer, even a conductive material formed from a fibrous carbon nanomaterial can be favorably and stably dispersed.

[Properties of CNTs]

The average diameter of CNTs that may suitably be used as the fibrous carbon nanomaterial is preferably 1 nm or more, and more preferably 10 nm or more, and is preferably 50 nm or less, more preferably 40 nm or less, and even more preferably 20 nm or less.

Moreover, the average length of CNTs that may suitably be used as the fibrous carbon nanomaterial is preferably 1 μm or more, more preferably 5 μm or more, and even more preferably 10 μm or more, and is preferably 40 μm or less, more preferably 30 μm or less, and even more preferably 20 μm or less.

When the average diameter and the average length are at least any of the lower limits set forth above, aggregation of the fibrous carbon nanomaterial can be sufficiently inhibited and sufficient dispersibility of the fibrous carbon nanomaterial as a conductive material can be ensured.

Moreover, when the average diameter and the average length are not more than any of the upper limits set forth above, good conduction path formation in an electrode mixed material layer can be achieved and secondary battery output characteristics can be further improved.

The "average diameter" and "average length" can be determined by measuring the diameters (external diameters) and lengths of 100 randomly selected CNTs using a TEM.

The BET specific surface area of CNTs that may suitably be used as the fibrous carbon nanomaterial is preferably 50 $m^2/g$ or more, and more preferably 100 $m^2/g$ or more, and is preferably 1,000 $m^2/g$ or less, more preferably 800 $m^2/g$ or less, and even more preferably 500 $m^2/g$ or less. When the BET specific surface area is at least any of the lower limits set forth above, good conduction path formation in an electrode mixed material layer can be achieved and secondary battery output characteristics can be further improved. Moreover, when the BET specific surface area is not more than any of the upper limits set forth above, aggregation of the fibrous carbon nanomaterial can be sufficiently inhibited and sufficient dispersibility of the fibrous carbon nanomaterial as a conductive material can be ensured.

In this disclosure, "BET specific surface area" refers to nitrogen adsorption specific surface area measured by the BET method, which can be measured in accordance with ASTM D3037-81.

Herein, the aspect ratio (major axis length/minor axis length) of the "fibrous carbon nanomaterial" is normally more than 5, and preferably 10 or more. The "aspect ratio" of the fibrous carbon nanomaterial can be determined by measuring the major axis lengths and minor axis lengths of 100 randomly selected fibers, or the like, of the fibrous carbon nanomaterial using a transmission electron microscope.

[Percentage Content]

The percentage content of the fibrous carbon nanomaterial among conductive material is preferably 50 mass % or more, more preferably more than 50 mass %, even more preferably 60 mass % or more, and further preferably 70 mass % or more, and may be 100 mass %. In other words, the content of the fibrous carbon nanomaterial in the conductive material paste composition is preferably more than the content of other conductive materials such as described in detail further below. When the percentage content of the fibrous carbon nanomaterial is at least any of the lower limits set forth above, better electrical contact can be ensured amongst an electrode active material in an electrode mixed material layer, internal resistance of an obtained secondary battery can be reduced, and the secondary battery can be caused display better output characteristics. Moreover, the capacity of a secondary battery can be maintained with greater stability.

[CNT Production]

CNTs having the properties set forth above can be produced by a known method such as an arc discharge method, a laser ablation method, or a super growth method without any specific limitations.

<Other Conductive Materials>

Examples of other conductive materials that can be used include conductive carbon materials such as acetylene black, Ketjen Black® (Ketjen black is a registered trademark in Japan, other countries, or both), carbon black, graphite, and graphene. Of these other conductive materials, graphite is particularly preferable.

Herein, the aspect ratio of the "other conductive material" is normally 5 or less, and preferably 2 or less. The "aspect ratio" of the other conductive material can be measured by the same method as the aspect ratio of the above-described fibrous carbon nanomaterial.

The other conductive material is preferably in particulate form. Moreover, the particle diameter of the other conductive material, in terms of volume average particle diameter, is preferably 10 nm or more, and more preferably 50 nm or more, and is preferably 10 μm or less, and more preferably 5 μm or less. This is because better dispersibility of the entire conductive material (fibrous carbon nanomaterial and other conductive material) in a conductive material paste composition or the like can be ensured when the particle diameter of the other conductive material is at least any of the lower limits set forth above. Moreover, high conductivity can be ensured when the particle diameter of the other conductive material is not more than any of the upper limits set forth above.

In this disclosure, "volume average particle diameter" refers to a particle diameter at which, in a particle size distribution (volume basis) measured by laser diffraction, cumulative volume calculated from a small diameter end of the distribution reaches 50%.

<Solvent>

The solvent of the conductive material paste composition may be an organic solvent but is not specifically limited thereto. Examples of organic solvents that can be used include alcohols such as methanol, ethanol, n-propanol, isopropanol, n-butanol, isobutanol, t-butanol, pentanol, hexanol, heptanol, octanol, nonanol, decanol, and amyl alcohol; ketones such as acetone, methyl ethyl ketone, and cyclohexanone; esters such as ethyl acetate and butyl acetate; ethers such as diethyl ether, dioxane, and tetrahydrofuran; amide-based polar organic solvents such as N,N-dimethylformamide and N-methylpyrrolidone (NMP); and aromatic hydrocarbons such as toluene, xylene, chlorobenzene, ortho-dichlorobenzene, and para-dichlorobenzene. One of these solvents may be used individually, or two or more of these solvents may be used as a mixture.

Of these solvents, NMP is preferable.

<Other Components>

Besides the components described above, the conductive material paste composition may contain other optional components such as a reinforcing material, a leveling agent, a viscosity modifier, and an additive for electrolysis solution. These other components are not specifically limited so long as they do not affect the battery reactions and may be selected from commonly known components such as those described in WO 2012/115096 A1. One of such components may be used individually, or two or more of such components may be used in combination in a freely selected ratio.

<Production of Conductive Material Paste Composition for Secondary Battery Electrode>

The presently disclosed conductive material paste composition for a secondary battery electrode can be produced by mixing a binder obtained as described above and a fibrous carbon nanomaterial as a conductive material in a solvent.

The mixing method is not specifically limited and may involve using a typical mixer such as a disper blade, a mill, or a kneader. Moreover, no specific limitations are placed on the mixing order in this mixing. For example, a fibrous carbon nanomaterial and optional other conductive materials may be added to a mixture obtained through mixing of a copolymer as a binder and a solvent. Alternatively, a copolymer may be added as a binder to a dispersion liquid obtained by dispersing a fibrous carbon nanomaterial and optional other conductive materials in a solvent. Furthermore, in a case in which the binder further includes a polymer or copolymer other than the first copolymer, the mixing order of the polymers is not specifically limited, but it is preferable that the polymer or copolymer other than the first copolymer is mixed with the solvent prior to mixing of the first copolymer.

(Slurry Composition for Secondary Battery Electrode)

The presently disclosed slurry composition for a secondary battery electrode contains an electrode active material and the conductive material paste composition set forth above. In other words, the presently disclosed slurry composition for a secondary battery electrode contains the above-described fibrous carbon nanomaterial, a binder including at least the first polymer, and a solvent, and may optionally further contain other conductive materials and other components. The fibrous carbon nanomaterial can be favorably dispersed in the presently disclosed slurry composition for a secondary battery electrode as a result of the slurry composition containing the conductive material paste composition set forth above. Moreover, the presently disclosed slurry composition for a secondary battery electrode can form an electrode mixed material layer on a current collector in a good adhesive state therewith as a result of containing the conductive material paste composition set forth above.

In other words, the presently disclosed slurry composition for a secondary battery electrode enables a balance of both high fibrous carbon nanomaterial dispersibility and high close adherence of an electrode produced therewith. Consequently, an electrode including an electrode mixed material layer formed using the presently disclosed slurry composition for a secondary battery electrode has high electrode mixed material layer close adherence and can cause a secondary battery to display excellent battery characteristics.

Although the following describes, as one example, a case in which the slurry composition for a secondary battery electrode is a slurry composition for a lithium ion secondary battery positive electrode, the presently disclosed slurry composition for a secondary battery electrode is not limited to the following example.

<Electrode Active Material>

The electrode active material is a substance that accepts and donates electrons in an electrode of a secondary battery. A substance that can occlude and release lithium is normally used as a positive electrode active material for a lithium ion secondary battery.

Specific examples of positive electrode active materials for lithium ion secondary batteries that may be used include, but are not specifically limited to, known positive electrode active materials such as lithium-containing cobalt oxide ($LiCoO_2$), lithium manganate ($LiMn_2O_4$), lithium-containing nickel oxide ($LiNiO_2$), lithium-containing composite oxide of Co—Ni—Mn ($Li(Co\ Mn\ Ni)O_2$), lithium-containing composite oxide of Ni—Mn—Al, lithium-containing composite oxide of Ni—Co—Al, olivine-type lithium iron phosphate ($LiFePO_4$), olivine-type lithium manganese phosphate ($LiMnPO_4$), a $Li_2MnO_3$—$LiNiO_2$-based solid solution, lithium rich spinel compounds represented by $Li_{1+x}Mn_{2-x}O_4$ ($0<x<2$), $Li[Ni_{0.17}Li_{0.2}Co_{0.07}Mn_{0.56}]O_2$, and $LiNi_{0.5}Mn_{1.5}O_4$.

The amount and particle diameter of the positive electrode active material are not specifically limited and may be the same as those of conventionally-used positive electrode active materials.

<Production of Slurry Composition for Secondary Battery Electrode>

The slurry composition for a secondary battery electrode can be produced by dissolving or dispersing the above-described conductive material paste composition and electrode active material in a solvent such as an organic solvent. Specifically, the slurry composition for a secondary battery electrode can be produced by mixing the above-described components and the solvent using a mixer such as a ball mill, a sand mill, a bead mill, a pigment disperser, a grinding machine, an ultrasonic disperser, a homogenizer, a planetary mixer, or a FILMIX. Note that the solvent contained in the conductive material paste composition may serve as the solvent used in production of the slurry composition for a secondary battery electrode.

Moreover, the mixing ratio of components in production of the slurry composition for a secondary battery electrode can be set as a ratio that enables production of a desired slurry composition. The mixing ratio of the fibrous carbon nanomaterial contained in the conductive material paste composition relative to 100 parts by mass of the electrode active material is normally at least 0.05 parts by mass and not more than 10 parts by mass, is preferably 0.1 parts by mass or more, and more preferably 0.5 parts by mass or more, and is preferably 5 parts by mass or less, and even more preferably 3 parts by mass or less.

The presently disclosed slurry composition for a secondary battery electrode is produced using the conductive material paste composition in which the fibrous carbon nanomaterial is favorably dispersed due to the binder including the first copolymer and the like being favorably adsorbed onto the surface of the fibrous carbon nanomaterial in advance. Consequently, the fibrous carbon nanomaterial can also be favorably dispersed in the produced slurry composition.

Moreover, through use of the conductive material paste composition in which the binder including the first copolymer and the like is favorably adsorbed onto the surface of the fibrous carbon nanomaterial in advance, the binder enables favorable binding amongst the electrode active material and between the electrode active material and the fibrous carbon nanomaterial in the produced slurry composition, and also enables favorable binding of an electrode mixed material layer to a current collector on which the electrode mixed material layer is formed.

(Electrode for Secondary Battery)

The presently disclosed electrode for a secondary battery includes a current collector and an electrode mixed material layer formed on the current collector, and is preferably a positive electrode. The electrode mixed material layer is formed using the slurry composition for a secondary battery electrode set forth above. In other words, the electrode mixed material layer contains at least an electrode active material, a fibrous carbon nanomaterial, and a binder including the first copolymer, and may optionally further contain other conductive materials and other components. It should be noted that components contained in the electrode mixed material layer are components that are contained in the previously described slurry composition for a secondary battery electrode. Furthermore, the preferred ratio of these components in the electrode mixed material layer is the same as the preferred ratio of these components in the slurry composition.

As a result of the presently disclosed electrode for a secondary battery being obtained using a slurry composition for a secondary battery electrode that contains the presently disclosed conductive material paste composition for a secondary battery electrode, a highly uniform electrode mixed material layer in which the fibrous carbon nanomaterial is favorably dispersed is formed with good close adherence on the current collector. Consequently, a secondary battery having excellent battery characteristics such as output characteristics can be obtained using this electrode.

<Current Collector>

The current collector is a material having electrical conductivity and electrochemical durability. Specifically, the current collector may, for example, be made of a metal material such as iron, copper, aluminum, nickel, stainless steel, titanium, tantalum, gold, or platinum. One of the aforementioned materials may be used individually, or two or more of the aforementioned materials may be used in combination in a freely selected ratio.

A layer that can increase binding force may be formed on a surface of the current collector that faces the electrode mixed material layer in order to achieve high close adherence with the electrode mixed material layer formed on the current collector.

[Undercoating Layer-Equipped Current Collector for Secondary Battery Electrode]

The presently disclosed undercoating layer-equipped current collector for a secondary battery electrode is a current collector that includes, on a current collector, an undercoating layer that can increase binding force between the current collector and an electrode mixed material layer. Specifically, the undercoating layer is required to contain a fibrous carbon nanomaterial and a binder that includes a polymer having a specific make-up and molecular weight. More specifically, the undercoating layer contains a fibrous carbon nanomaterial and a binder, wherein the binder includes a first copolymer including an alkylene structural unit and a nitrile group-containing monomer unit and having a weight average molecular weight of at least 170,000 and less than 1,500,000. In addition to these components, the undercoating layer may optionally further contain other conductive materials and other components such as previously described.

The presently disclosed undercoating layer-equipped current collector for a secondary battery electrode may be used in a positive electrode or a negative electrode.

As a result of the undercoating layer containing the above-described fibrous carbon nanomaterial and the first copolymer having a specific make-up and molecular weight, an electrode mixed material layer formed on the undercoating layer-equipped current collector for a secondary battery electrode can be favorably bound to the current collector. Moreover, the current collector and the electrode mixed material layer are in good electrical connection via the undercoating layer. Furthermore, a secondary battery that is produced using an electrode obtained by forming an electrode mixed material layer on this undercoating layer-equipped current collector can be provided with excellent battery characteristics.

The fibrous carbon nanomaterial in the undercoating layer may be any of the fibrous carbon nanomaterials that can be used in the previously described conductive material paste composition, and the preferred form of this fibrous carbon nanomaterial is also the same as for the fibrous carbon nanomaterial used in the conductive material paste composition. Specifically, the fibrous carbon nanomaterial in the undercoating layer is preferably one or more carbon nanotubes, and is more preferably one or more carbon nanotubes having preferred properties that are the same as previously described in relation to the conductive material paste composition. Even more preferably, the carbon nanotubes are used with a preferred percentage content that is the same as previously described in relation to the conductive material paste composition.

The binder in the undercoating layer may be any of the binders that can be used in the previously described conductive material paste composition (i.e., the first polymer and optional components such as the second polymer and/or fluorine-containing polymer), and the preferred form and amount of this binder is also the same as for the binder used in the conductive material paste composition. More specifically, the binder in the undercoating layer preferably further includes a second copolymer including an alkylene structural unit and a nitrile group-containing monomer unit and having a weight average molecular weight of at least 10,000 and less than 170,000. It is more preferable that the second copolymer has preferred properties that are the same as previously described in relation to the conductive material paste composition.

The percentage content of the second copolymer that may be further contained in the undercoating layer is preferably 0.5 mass % or more and preferably less than 50 mass % relative to the total content of the binder. It is more preferable that the percentage content of the second copolymer is a preferred percentage content that is the same as previously described in relation to the conductive material paste composition.

Furthermore, other conductive materials that can be contained in the undercoating layer may be the same as the other conductive materials that can be contained in the previously described conductive material paste composition, and the preferred ranges and amounts of these other conductive materials are also the same as for the other conductive materials that can be used in the conductive material paste composition.

[[Formation of Undercoating Layer-Equipped Current Collector for Secondary Battery Electrode]]

The presently disclosed undercoating layer-equipped current collector for a secondary battery electrode is obtained by forming the above-described undercoating layer on the above-described current collector. The formation method of the undercoating layer is not specifically limited and may, for example, involve production through a step of applying, onto a current collector, a composition (undercoating layer composition) containing a fibrous carbon nanomaterial, a binder including the first copolymer, a solvent, and optional other conductive materials and other components, and a step of drying the applied undercoating layer composition.

The solvent may be any of the solvents that can be used in the previously described conductive material paste composition.

[[Undercoating Layer Composition Application Step]]

The undercoating layer composition can be applied onto the current collector by a commonly known method without any specific limitations. Specific examples of application methods that can be used include doctor blading, dip coating, reverse roll coating, direct roll coating, gravure coating, extrusion coating, and brush coating.

[[Undercoating Layer Composition Drying Step]]

The method by which the undercoating layer composition that has been applied onto the current collector is dried is not specifically limited and may be a commonly known method. Examples of drying methods that can be used include drying by warm, hot, or low-humidity air; drying in a vacuum; and drying by irradiation of infrared light, electron beams, or the like. Drying of the undercoating layer composition on the current collector in this manner forms an undercoating layer on the current collector and thereby provides an undercoating layer-equipped current collector for a secondary battery electrode that includes the current collector and the undercoating layer.

<Production Method of Electrode for Secondary Battery>

The presently disclosed electrode for a secondary battery can be produced, for example, through a step of applying the previously described slurry composition onto a current collector (application step) and a step of drying the slurry composition that has been applied onto the current collector to form an electrode mixed material layer on the current collector (drying step).

[Application Step]

The slurry composition can be applied onto the current collector by a commonly known method without any specific limitations. Specific examples of application methods that can be used include doctor blading, dip coating, reverse roll coating, direct roll coating, gravure coating, extrusion coating, and brush coating. The slurry composition may be applied onto one surface or both surfaces of the current collector. The thickness of the slurry coating on the current collector after application but before drying may be set as appropriate in accordance with the thickness of the electrode mixed material layer to be obtained after drying.

The current collector may be the undercoating layer-equipped current collector set forth above or a current collector that does not include an undercoating layer.

[Drying Step]

The slurry composition on the current collector may be dried by a commonly known method without any specific limitations. Examples of drying methods that can be used include drying by warm, hot, or low-humidity air; drying in a vacuum; and drying by irradiation with infrared light, electron beams, or the like. Drying of the slurry composition on the current collector in this manner forms an electrode mixed material layer on the current collector and thereby provides an electrode for a secondary battery that includes the current collector and the electrode mixed material layer.

After the drying step, the electrode mixed material layer may be further subjected to a pressing process, such as mold pressing or roll pressing. The pressing process can improve close adherence between the electrode mixed material layer and the current collector. Furthermore, in a case in which the electrode mixed material layer contains a curable polymer, the polymer is preferably cured after the electrode mixed material layer has been formed.

In a case in which the undercoating layer-equipped current collector is used as the current collector, an electrode mixed material layer can be formed on the undercoating layer-equipped current collector through the same drying step.

(Secondary Battery)

The presently disclosed secondary battery includes at least the presently disclosed electrode for a secondary battery. Moreover, the presently disclosed secondary battery may, for example, include a positive electrode, a negative electrode, an electrolysis solution, and a separator, wherein the presently disclosed electrode for a secondary battery is used as at least one of the positive electrode and the negative electrode. The presently disclosed secondary battery has excellent battery characteristics such as output characteristics as a result of including the presently disclosed electrode for a secondary battery.

The presently disclosed secondary battery is preferably a secondary battery in which the presently disclosed electrode for a secondary battery is used as the positive electrode. Although the following describes, as one example, a case in which the secondary battery is a lithium ion secondary battery, the presently disclosed secondary battery is not limited to the following example.

<Electrodes>

As explained above, the presently disclosed electrode for a secondary battery is used as at least one of the positive electrode and the negative electrode. In other words, the positive electrode of the secondary battery may be the presently disclosed electrode and the negative electrode of the secondary battery may be a known negative electrode other than the presently disclosed electrode. Alternatively, the negative electrode of the secondary battery may be the presently disclosed electrode and the positive electrode of the secondary battery may be a known positive electrode other than the presently disclosed electrode. Further alternatively, the positive electrode and the negative electrode of the secondary battery may both be the presently disclosed electrode.

<Electrolysis Solution>

The electrolysis solution is normally an organic electrolysis solution obtained by dissolving a supporting electrolyte in an organic solvent. The supporting electrolyte of a lithium ion secondary battery may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable, and $LiPF_6$ is particularly preferable as these lithium salts readily dissolve in solvents and exhibit a high degree of dissociation. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolysis solution is not specifically limited so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such solvents may be used. Of these solvents, carbonates are preferred for their high dielectric constant and broad stable potential region, and a mixture of ethylene carbonate and ethyl methyl carbonate is more preferable.

The concentration of the electrolyte in the electrolysis solution can be adjusted as appropriate and is, for example, preferably 0.5 mass % to 15 mass %, more preferably 2 mass % to 13 mass %, and even more preferably 5 mass % to 10 mass %. Known additives such as fluoroethylene carbonate and ethyl methyl sulfone may be added to the electrolysis solution.

<Separator>

Examples of separators that can be used include, but are not specifically limited to, those described in JP 2012-204303 A. Of these separators, a microporous membrane made of polyolefinic (polyethylene, polypropylene, polybutene, or polyvinyl chloride) resin is preferred because such a membrane can reduce the total thickness of the separator, which increases the ratio of electrode active material in the secondary battery, and consequently increases the capacity per volume.

<Production Method of Secondary Battery>

The presently disclosed secondary battery may be produced, for example, by stacking the positive electrode and the negative electrode with the separator in-between, performing rolling, folding, or the like of the resultant laminate in accordance with the battery shape as necessary to place the laminate in a battery container, injecting the electrolysis solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

The following methods were used in the examples and comparative examples to measure and evaluate the percentage contents of alkylene structural units and nitrile group-containing monomer units in first and second copolymers, the iodine values of first and second copolymers, the weight average molecular weights of a first copolymer, a second copolymer, and a fluorine-containing polymer, the dispersibility of a conductive material in a slurry composition, the dispersibility of a conductive material in an undercoating layer composition, the close adherence of an electrode for a secondary battery, the close adherence of an undercoating layer-equipped current collector, the output characteristics of a secondary battery, and the capacity storage stability of a secondary battery.

<Percentage Contents of Alkylene Structural Units and Nitrile Group-Containing Monomer Units>

A water dispersion of each copolymer was coagulated in methanol and was then vacuum dried for 12 hours at a temperature of 60° C. to prepare a measurement sample. The proportions (mass %) of alkylene structural units and nitrile group-containing monomer units contained in the measurement sample were measured by $^1$H-NMR. The measured values are shown in Tables 1 and 2.

<Iodine Value>

A water dispersion of each copolymer in an amount of 100 g was coagulated in 1 L of methanol and was then vacuum dried for 12 hours at a temperature of 60° C. The iodine value (mg/100 mg) of the dried polymer that was obtained was measured in accordance with JIS K6235; 2006. The measured values are shown in Tables 1 and 2.

<Weight Average Molecular Weight>

The weight average molecular weights of a first copolymer, a second copolymer, and a fluorine-containing polymer were measured as values in terms of polystyrene by gel permeation chromatography (solvent: tetrahydrofuran) using a high-performance GPC device (produced by Tosoh Corporation; model: HLC-8220GPC; column: TSK-GEL Super HMZ-N).

<Dispersibility of Conductive Material (Fibrous Carbon Nanomaterial and Optional Other Conductive Material) in Slurry Composition>

The initial viscosity ($\eta_0$) of an obtained slurry composition for a secondary battery electrode was measured at a temperature of 25° C. and a rotation speed of 60 rpm using a B-type viscometer (produced by Toki Sangyo Co., Ltd.; model: RB80L).

The obtained slurry composition for a secondary battery electrode was stored at rest without stirring. After 10 days had passed, the occurrence of sedimentation of a fibrous carbon nanomaterial and an optional other conductive material, redispersibility upon stirring, and the degree of viscosity recovery upon stirring were confirmed. The degree of viscosity recovery was calculated from an equation: ($\eta_1$/$\eta_0$)×100% by measuring the post-resting viscosity ($\eta_1$) of the stored slurry composition for a secondary battery electrode at a rotation speed of 60 rpm after the slurry composition had been stirred for 15 minutes at a rotation speed of 2,000 rpm. The conductive material dispersibility was evaluated by the following standard.

A: Sedimentation does not occur

B: Sedimentation occurs but redispersion is achieved through stirring (degree of viscosity recovery: at least 90% and not more than 100% of initial viscosity)

C: Sedimentation occurs but redispersion is achieved through stirring (degree of viscosity recovery: at least 80% and less than 90% of initial viscosity)

D: Sedimentation occurs but redispersion is achieved through stirring (degree of viscosity recovery: less than 80% of initial viscosity)

E: Sedimentation occurs and redispersion is not achieved even through stirring

A smaller amount of sedimentation of the fibrous carbon nanomaterial and optional other conductive material and a larger degree of viscosity recovery indicate that more favorable and stable conductive material dispersion can be achieved. The evaluation results are shown in Table 1.

<Dispersibility of Conductive Material (Fibrous Carbon Nanomaterial and Optional Other Conductive Material) in Undercoating Layer Composition>

The conductive material dispersibility in an undercoating layer composition was measured and evaluated by the same method as described for conductive material dispersibility in a slurry composition. The evaluation results are shown in Table 2.

<Close Adherence of Electrode for Secondary Battery>

The close adherence of an electrode for a secondary battery (Examples 1 to 16 and Comparative Examples 1 to 3) was measured as the peel strength between a current collector and an electrode mixed material layer by the following method.

A positive electrode produced in each of Examples 1 to 16 and Comparative Examples 1 to 3 was cut out as a rectangle of 100 mm in length and 10 mm in width to obtain a specimen. The specimen was placed with the surface of the positive electrode mixed material layer underneath and cellophane tape (tape prescribed by JIS Z1522) was affixed to the surface of the positive electrode mixed material layer. One end of the current collector was pulled in a vertical direction at a pulling speed of 50 mm/minute to peel off the current collector and the stress during this peeling was measured (note that the cellophane tape was secured to a test bed). This measurement was performed three times. The average value of the measurement results was taken to be the peel strength (N/m) and was evaluated by the following standard.

A: Peel strength of 15 N/m or more

B: Peel strength of at least 10 N/m and less than 15 N/m

C: Peel strength of at least 5 N/m and less than 10 N/m

D: Peel strength of less than 5 N/m

A larger peel strength indicates larger binding force of the positive electrode mixed material layer to the current collector and thus indicates stronger close adherence. The evaluation results are shown in Table 1.

<Close Adherence of Undercoating Layer-Equipped Current Collector>

The close adherence of an undercoating layer-equipped current collector (Example 17 and Comparative Example 4) was measured as the peel strength between a current collector and an undercoating layer by the following method.

An undercoating layer composition produced in each of Example 17 and Comparative Example 4 was applied onto aluminum foil (current collector) of 15 μm in thickness such as to have a coating thickness of 15 μm after drying and was dried to obtain an undercoating layer-equipped current collector. The obtained undercoating layer-equipped current collector was cut out as a rectangle of 100 mm in length and 10 mm in width to obtain a specimen. The specimen was placed with the surface of the undercoating layer underneath and cellophane tape (tape prescribed by JIS Z1522) was affixed to the surface of the undercoating layer. One end of the current collector was pulled in a vertical direction at a pulling speed of 50 mm/minute to peel off the current collector and the stress during this peeling was measured (note that the cellophane tape was secured to a test bed). This measurement was performed three times. The average value of the measurement results was taken to be the peel strength (N/m) and was evaluated by the following standard.

A: Peel strength of 50 N/m or more

B: Peel strength of at least 40 N/m and less than 50 N/m

C: Peel strength of at least 30 N/m and less than 40 N/m

D: Peel strength of less than 30 N/m

A larger peel strength indicates larger binding force of the undercoating layer to the current collector and thus indicates stronger close adherence. The evaluation results are shown in Table 2.

<Output Characteristics of Secondary Battery>

A produced secondary battery was constant-current charged at 0.2 CmA to a battery voltage of 4.4 V at an ambient temperature of 25° C. and was then constant-voltage charged at 4.4 V until the charging current reached 0.02 CmA. Next, the secondary battery was constant-current discharged at 0.2 CmA to a battery voltage of 3.0 V and the capacity at the end of constant-current discharging was taken to be the initial capacity.

After measurement of the initial capacity, the secondary battery was constant-current charged at 0.2 CmA to a battery voltage of 4.4 V and was then constant-voltage charged at 4.4 V until the charging current reached 0.02 CmA. Next, the secondary battery was constant-current discharged at 3 CmA to a battery voltage of 3.0 V and the capacity at the end of constant-current discharging was taken to be the 3C capacity.

A value calculated from (3C capacity)/(initial capacity)×100% using the obtained capacity values was taken to be an output characteristic and was evaluated by the following standard.

A: Output characteristic of 85% or more
B: Output characteristic of at least 80% and less than 85%
C: Output characteristic of at least 70% and less than 80%
D: Output characteristic of less than 70%

A higher value indicates better output characteristics. The evaluation results are shown in Tables 1 and 2.

<Capacity Storage Stability of Secondary Battery>

The initial capacity of a produced secondary battery was measured. The secondary battery was then constant-current charged at 0.2 CmA to a battery voltage of 4.4 V. Thereafter, the secondary battery was storage for 20 days in a 60° C. thermostatic chamber. After this storage, the secondary battery was constant-current discharged at 0.2 CmA to a battery voltage of 3.0 V. The capacity at the end of the constant-current discharging was measured as the 0.2C capacity.

A value calculated from (0.2C capacity)/(initial capacity)×100% using the obtained capacity values was taken to be the capacity storage stability and was evaluated by the following standard.

A: Capacity storage stability of 85% or more
B: Capacity storage stability of at least 80% and less than 85%
C: Capacity storage stability of at least 70% and less than 80%
D: Capacity storage stability of less than 70%

A higher value indicates better capacity storage stability. The evaluation results are shown in Table 1.

Example 1

<Production of Conductive Material Paste Composition for Secondary Battery Electrode>
[[Production of First Copolymer]]

An autoclave equipped with a stirrer was charged with 240 parts of deionized water, 0.5 parts of sodium alkylbenzenesulfonate as an emulsifier, 35 parts of acrylonitrile as a nitrile group-containing monomer, and 0.3 parts of t-dodecyl mercaptan as a chain transfer agent in this order. The inside of the autoclave was purged with nitrogen, and then 65 parts of 1,3-butadiene as a conjugated diene monomer was fed into the autoclave under pressure and 0.25 parts of ammonium persulfate was added as a polymerization initiator to perform a polymerization reaction at a reaction temperature of 40° C. Through this reaction, a copolymer including acrylonitrile and 1,3-butadiene was obtained. The polymerization conversion rate was 85%.

Deionized water was added to the resultant copolymer to obtain a solution adjusted to a total solid content concentration of 12 mass %. An autoclave of 1 L in capacity equipped with a stirrer was charged with 400 mL of the resultant solution (total solid content: 48 g), and nitrogen gas was passed through the solution for 10 minutes to remove dissolved oxygen present in the solution. Thereafter, 75 mg of palladium acetate as a hydrogenation reaction catalyst was dissolved in 180 mL of deionized water to which nitric acid had been added in an amount of 4 molar equivalents of the palladium (Pd), and the resultant solution was added into the autoclave. The system was purged twice with hydrogen gas, and then the contents of the autoclave were heated to 50° C. in a state in which the pressure was increased to 3 MPa with hydrogen gas, and a hydrogenation reaction (first stage hydrogenation reaction) was performed for 6 hours.

The autoclave was subsequently returned to atmospheric pressure. Then, 25 mg of palladium acetate as a hydrogenation reaction catalyst was dissolved in 60 mL of deionized water to which nitric acid had been added in an amount of 4 molar equivalents of the Pd, and the resultant solution was added into the autoclave. The system was purged twice with hydrogen gas, and then the contents of the autoclave were heated to 50° C. in a state in which the pressure was increased to 3 MPa with hydrogen gas, and a hydrogenation reaction (second stage hydrogenation reaction) was performed for 6 hours.

Next, the contents of the autoclave were returned to normal temperature and the system was converted to a nitrogen atmosphere. Thereafter, the contents were concentrated to a solid content concentration of 40% using an evaporator to yield a water dispersion of a first copolymer.

The resultant first copolymer had a weight average molecular weight of 400,000 and an iodine value of 20 mg/100 mg. The percentage content of alkylene structural units in the resultant first copolymer was 65 mass %. Moreover, the percentage content of nitrile group-containing monomer units in the resultant first copolymer was 35 mass %.

[[Production of Second Copolymer]]

A water dispersion of a second copolymer was produced by the same method as the production method of the first copolymer with the exception that the amount of t-dodecyl mercaptan used as a chain transfer agent was changed to 1.1 parts.

The resultant second copolymer had a weight average molecular weight of 80,000 and an iodine value of 20 mg/100 mg. The percentage content of alkylene structural units in the resultant second copolymer was 65 mass %. Moreover, the percentage content of nitrile group-containing monomer units in the resultant second copolymer was 35 mass %.

[Production of Binder]

N-methylpyrrolidone (NMP) was added as a solvent to 10 parts in terms of solid content of the obtained water dispersion of the first copolymer and 3.5 parts in terms of solid content of the obtained water dispersion of the second copolymer, and then water was evaporated under reduced pressure to yield an NMP solution containing hydrogenated copolymer.

Next, 10 parts of polyvinylidene fluoride (PVdF; weight average molecular weight: 1,000,000) was added to the obtained NMP solution as a fluorine-containing polymer and was stirred therewith using a disper blade (30 minutes at a rotation speed of 2,000 rpm).

A binder containing the first copolymer, the second copolymer, and the fluorine-containing polymer was obtained as a result.

[Preparation of Fibrous Carbon Nanomaterial]

Carbon nanotubes (CNTs; produced by CNano; product name: FloTube 9110; average diameter: 10 nm; average length: 10 μm; BET specific surface area: 200 m$^2$/g) were used as a fibrous carbon nanomaterial.

[Production of Conductive Material Paste Composition]

A conductive material paste composition for a secondary battery electrode was obtained by stirring 100 parts of the fibrous carbon nanomaterial (above-described CNTs) as a conductive material, 23.5 parts in terms of solid content of the binder containing the first copolymer, the second copolymer, and the fluorine-containing polymer obtained as described above, and an appropriate amount of NMP as a solvent using a disper blade (30 minutes at a rotation speed of 2,000 rpm).

<Production of Slurry Composition for Secondary Battery Electrode>

A slurry composition for a positive electrode was obtained as a slurry composition for a secondary battery electrode by stirring 100 parts of LiCoO$_2$ as a positive electrode active material and the conductive material paste composition obtained as described above (equivalent to 1 part of CNTs in terms of solid content) for 30 minutes at a rotation speed of 2,000 rpm using a disper blade.

The resultant slurry composition for a secondary battery electrode was used to evaluate the dispersion stability of the fibrous carbon nanomaterial. The results are shown in Table 1.

<Production of Positive Electrode for Secondary Battery>

Aluminum foil of 12 μm in thickness was prepared as a current collector. A comma coater was used to apply the slurry composition for a secondary battery electrode obtained as described above onto one surface of the aluminum foil such as to achieve a coating weight of 20 mg/cm$^2$ after drying. The slurry composition for a secondary battery electrode was dried by conveying the aluminum foil inside a 120° C. oven for 10 minutes at a speed of 1 m/minute to obtain a positive electrode web. The positive electrode web was rolled by roll pressing to produce, as an electrode for a secondary battery, a positive electrode including a positive electrode mixed material layer of 60 in thickness.

The resultant positive electrode was used to evaluate electrode close adherence. The results are shown in Table 1.

<Production of Negative Electrode for Secondary Battery>

A planetary mixer equipped with a disper blade was charged with 97 parts of artificial graphite (volume-average particle diameter: 24.5 μm; specific surface area of 4 m$^2$/g) as a negative electrode active material and 1.5 part in terms of solid content of a 1% aqueous solution of carboxymethyl cellulose (BSH-12 produced by DKS Co., Ltd.) as a dispersant, the solid content concentration was adjusted to 45% with deionized water, and then mixing was performed for 40 minutes at 25° C. Next, the solid content concentration was adjusted to 40% with deionized water. Further mixing was performed for 30 minutes at 25° C. to yield a mixed liquid.

Next, 1.5 parts in terms of solid content of a 40% water dispersion of a styrene-butadiene copolymer (glass transition temperature: −15° C.) as a binder and deionized water were added to the mixed liquid obtained as described above to adjust the final solid content concentration to 35%, and mixing was performed for 10 minutes. The resultant mixed liquid was subjected to a defoaming process under reduced pressure to yield a slurry composition for a negative electrode.

A comma coater was used to apply the resultant slurry composition for a negative electrode onto copper foil (current collector) of 15 μm in thickness such as to have a thickness of approximately 80 μm after drying. The applied slurry composition for a negative electrode was dried by conveying the copper foil inside a 120° C. oven for 10 minutes at a speed of 1 m/minute to obtain a negative electrode web. The negative electrode web was rolled by roll pressing to obtain a negative electrode including a negative electrode mixed material layer of 65 μm in thickness.

<Preparation of Separator>

A single-layer polypropylene separator (width: 65 mm; length: 500 mm; thickness: 25 μm; produced by a dry method; porosity: 55%) was cut out as a 5 cm×5 cm square.

<Production of Secondary Battery>

A secondary battery was produced using the positive electrode, negative electrode, and separator that were obtained as described above.

Specifically, an aluminum packing case was prepared as a battery case. The positive electrode obtained as described above was cut out as a 4 cm×4 cm square and was placed such that the surface at the current collector side of the positive electrode was in contact with the aluminum packing case. The square separator obtained as described above was placed on the positive electrode mixed material layer of the positive electrode. Moreover, the negative electrode obtained as described above was cut out as a 4.2 cm×4.2 cm square and was placed on the separator such that the surface at the negative electrode mixed material layer side of the negative electrode faced the separator. The aluminum packing case was filled with a LiPF$_6$ solution of 1 M in concentration that contained 1% of vinylene carbonate (VC). The solvent of the LiPF$_6$ solution was a mixed solvent of ethylene carbonate (EC) and ethyl methyl carbonate (EMC) (EC/EMC=3/7 (volume ratio)). The aluminum packing case was then closed by heat sealing at 150° C. to tightly seal an opening of the aluminum packing case, and thereby obtain a lithium ion secondary battery.

The resultant lithium ion secondary battery was used to evaluate output characteristics and capacity storage stability. The results are shown in Table 1.

Example 2

A binder, a conductive material paste composition for a secondary battery electrode, a slurry composition for a secondary battery electrode, an electrode (positive electrode) for a secondary battery, a negative electrode, and a secondary battery were produced in the same way as in Example 1 with the exception that the amount of the water dispersion of the first copolymer used in production of the binder was changed to 20 parts in terms of solid content and the binder was produced without adding polyvinylidene fluoride. Evaluations were conducted in the same manner as in Example 1. The results are shown in Table 1.

Example 3

A binder, a conductive material paste composition for a secondary battery electrode, a slurry composition for a secondary battery electrode, an electrode (positive electrode) for a secondary battery, a negative electrode, and a secondary battery were produced in the same way as in Example 1 with the exception that the amount of the water dispersion of the first copolymer used in production of the binder was changed to 23.5 parts in terms of solid content and the binder was produced without adding the second copolymer and polyvinylidene fluoride. Evaluations were conducted in the same manner as in Example 1. The results are shown in Table 1.

Example 4

A binder, a conductive material paste composition for a secondary battery electrode, a slurry composition for a secondary battery electrode, an electrode (positive electrode) for a secondary battery, a negative electrode, and a secondary battery were produced in the same way as in Example 1 with the exception that the amount of the water dispersion of the first copolymer used in production of the binder was changed to 13.5 parts in terms of solid content and the binder was produced without adding the second copolymer. Evaluations were conducted in the same manner as in Example 1. The results are shown in Table 1.

Example 5

A binder, a conductive material paste composition for a secondary battery electrode, a slurry composition for a secondary battery electrode, an electrode (positive electrode) for a secondary battery, a negative electrode, and a secondary battery were produced in the same way as in Example 1 with the exception that in production of the first copolymer, the amount of 1,3-butadiene was changed to 80 parts and the amount of acrylonitrile was changed to 20 parts such that the percentage content of alkylene structural units in the first copolymer was 80 mass % and the percentage content of nitrile group-containing monomer units in the first copolymer was 20 mass %, and the reaction time and the hydrogen pressure in the hydrogenation reaction were changed such that the reaction was terminated with an iodine value shown in Table 1 (2 mg/100 mg) as an end point. Evaluations were conducted in the same manner as in Example 1. The results are shown in Table 1.

Example 6

A binder, a conductive material paste composition for a secondary battery electrode, a slurry composition for a secondary battery electrode, an electrode (positive electrode) for a secondary battery, a negative electrode, and a secondary battery were produced in the same way as in Example 1 with the exception that in production of the first copolymer, the reaction time and the hydrogen pressure in the hydrogenation reaction were changed such that the reaction was terminated with an iodine value shown in Table 1 (60 mg/100 mg) as an end point. Evaluations were conducted in the same manner as in Example 1. The results are shown in Table 1.

Example 7

A binder, a conductive material paste composition for a secondary battery electrode, a slurry composition for a secondary battery electrode, an electrode (positive electrode) for a secondary battery, a negative electrode, and a secondary battery were produced in the same way as in Example 1 with the exception that the amount of t-dodecyl mercaptan used in production of the first copolymer was changed to 0.5 parts such that the weight average molecular weight of the first copolymer was changed to 200,000, and the amount of t-dodecyl mercaptan used in production of the second copolymer was changed to 2.0 parts such that the weight average molecular weight of the second copolymer was changed to 30,000. Evaluations were conducted in the same manner as in Example 1. The results are shown in Table 1.

Example 8

A binder, a conductive material paste composition for a secondary battery electrode, a slurry composition for a secondary battery electrode, an electrode (positive electrode) for a secondary battery, a negative electrode, and a secondary battery were produced in the same way as in Example 1 with the exception that the amount of t-dodecyl mercaptan used in production of the first copolymer was changed to 0.1 parts such that the weight average molecular weight of the first copolymer was changed to 600,000, and the amount of t-dodecyl mercaptan used in production of the second copolymer was changed to 1.0 parts such that the weight average molecular weight of the second copolymer was changed to 100,000. Evaluations were conducted in the same manner as in Example 1. The results are shown in Table 1.

Example 9

A binder, a conductive material paste composition for a secondary battery electrode, a slurry composition for a secondary battery electrode, an electrode (positive electrode) for a secondary battery, a negative electrode, and a secondary battery were produced in the same way as in Example 1 with the exception that in production of the binder, the amount of the water dispersion of the first copolymer was changed to 7 parts in terms of solid content, the amount of the water dispersion of the second copolymer was changed to 9.5 parts in terms of solid content, and the amount of polyvinylidene fluoride was changed to 7 parts. Evaluations were conducted in the same manner as in Example 1. The results are shown in Table 1.

Example 10

A binder, a conductive material paste composition for a secondary battery electrode, a slurry composition for a secondary battery electrode, an electrode (positive electrode) for a secondary battery, a negative electrode, and a secondary battery were produced in the same way as in Example 1 with the exception that in production of the binder, the amount of the water dispersion of the first copolymer was changed to 11.6 parts in terms of solid content, the amount of the water dispersion of the second copolymer was changed to 0.3 parts in terms of solid content, and the amount of polyvinylidene fluoride was changed to 11.6 parts. Evaluations were conducted in the same manner as in Example 1. The results are shown in Table 1.

Example 11

A binder, a conductive material paste composition for a secondary battery electrode, a slurry composition for a secondary battery electrode, an electrode (positive electrode) for a secondary battery, a negative electrode, and a secondary battery were produced in the same way as in Example 1 with the exception that in production of the binder, the amount of the water dispersion of the first copolymer was changed to 5 parts in terms of solid content, the amount of the water dispersion of the second copolymer was changed to 1.7 parts in terms of solid content, and the amount of polyvinylidene fluoride was changed to 5 parts, and in production of the conductive material paste composition, the amount of the binder was changed to 11.7 parts in terms of solid content. Evaluations were conducted in the same manner as in Example 1. The results are shown in Table 1.

Example 12

A binder, a conductive material paste composition for a secondary battery electrode, a slurry composition for a secondary battery electrode, an electrode (positive electrode) for a secondary battery, a negative electrode, and a secondary battery were produced in the same way as in Example 1 with the exception that in production of the binder, the amount of the water dispersion of the first copolymer was changed to 20 parts in terms of solid content, the amount of the water dispersion of the second copolymer was changed to 7 parts in terms of solid content, and the amount of polyvinylidene fluoride was changed to 20 parts, and in production of the conductive material paste composition, the amount of the binder was changed to 47 parts in terms of solid content. Evaluations were conducted in the same manner as in Example 1. The results are shown in Table 1.

Example 13

A binder, a conductive material paste composition for a secondary battery electrode, a slurry composition for a secondary battery electrode, an electrode (positive electrode) for a secondary battery, a negative electrode, and a secondary battery were produced in the same way as in Example 1 with the exception that 70 parts of the fibrous carbon nanomaterial (CNTs) and 30 parts of another conductive material (non-fibrous carbon nanomaterial) of graphite (produced by Timcal Ltd.; product name: KS-4) were used as the conductive material in production of the conductive material paste composition. Evaluations were conducted in the same manner as in Example 1. The results are shown in Table 1.

Example 14

A binder, a conductive material paste composition for a secondary battery electrode, a slurry composition for a secondary battery electrode, an electrode (positive electrode) for a secondary battery, a negative electrode, and a secondary battery were produced in the same way as in Example 1 with the exception that 50 parts of the fibrous carbon nanomaterial (CNTs) and 50 parts of another conductive material (non-fibrous carbon nanomaterial) of graphite (produced by Timcal Ltd.; product name: KS-4) were used as the conductive material in production of the conductive material paste composition. Evaluations were conducted in the same manner as in Example 1. The results are shown in Table 1.

Example 15

A binder, a conductive material paste composition for a secondary battery electrode, a slurry composition for a secondary battery electrode, an electrode (positive electrode) for a secondary battery, a negative electrode, and a secondary battery were produced in the same way as in Example 1 with the exception that a first copolymer and a second copolymer were produced by the following methods. Evaluations were conducted in the same manner as in Example 1. The results are shown in Table 1.

[[Production of First Copolymer]]

An autoclave equipped with a stirrer was charged with 240 parts of deionized water, 0.5 parts of sodium alkylbenzenesulfonate as an emulsifier, 20 parts of acrylonitrile as a nitrile group-containing monomer, 20 parts of butyl acrylate as a monomer for forming another repeating unit, and 0.3 parts of t-dodecyl mercaptan as a chain transfer agent in this order. The inside of the autoclave was purged with nitrogen, and then 60 parts of 1,3-butadiene as a conjugated diene monomer was fed into the autoclave under pressure and 0.25 parts of ammonium persulfate was added as a polymerization initiator to perform a polymerization reaction at a reaction temperature of 40° C. Through this reaction, a copolymer including acrylonitrile and 1,3-butadiene was obtained. The polymerization conversion rate was 85%.

Deionized water was added to the resultant copolymer to obtain a solution adjusted to a total solid content concentration of 12 mass %. An autoclave of 1 L in capacity equipped with a stirrer was charged with 400 mL of the resultant solution (total solid content: 48 g), and nitrogen gas was passed through the solution for 10 minutes to remove dissolved oxygen present in the solution. Thereafter, 75 mg of palladium acetate as a hydrogenation reaction catalyst was dissolved in 180 mL of deionized water to which nitric acid had been added in an amount of 4 molar equivalents of the palladium (Pd), and the resultant solution was added into the autoclave. The system was purged twice with hydrogen gas, and then the contents of the autoclave were heated to 50° C. in a state in which the pressure was increased to 3 MPa with hydrogen gas, and a hydrogenation reaction (first stage hydrogenation reaction) was performed for 6 hours.

The autoclave was subsequently returned to atmospheric pressure. Then, 25 mg of palladium acetate as a hydrogenation reaction catalyst was dissolved in 60 mL of deionized water to which nitric acid had been added in an amount of 4 molar equivalents of the Pd, and the resultant solution was added into the autoclave. The system was purged twice with hydrogen gas, and then the contents of the autoclave were heated to 50° C. in a state in which the pressure was increased to 3 MPa with hydrogen gas, and a hydrogenation reaction (second stage hydrogenation reaction) was performed for 6 hours.

Next, the contents of the autoclave were returned to normal temperature and the system was converted to a nitrogen atmosphere. Thereafter, the contents were concentrated to a solid content concentration of 40% using an evaporator to yield a water dispersion of a first copolymer.

The resultant first copolymer had a weight average molecular weight of 400,000 and an iodine value of 20 mg/100 mg. The percentage content of alkylene structural units in the resultant first copolymer was 60 mass %. Moreover, the percentage content of nitrile group-containing monomer units in the resultant first copolymer was 20 mass %.

[[Production of Second Copolymer]]

A water dispersion of a second copolymer was obtained by the same method as the production method of the first copolymer with the exception that the amount of t-dodecyl mercaptan used as a chain transfer agent was changed to 1.1 parts.

The resultant second copolymer had a weight average molecular weight of 80,000 and an iodine value of 20 mg/100 mg. The percentage content of alkylene structural units in the resultant second copolymer was 60 mass %.

Moreover, the percentage content of nitrile group-containing monomer units in the resultant second copolymer was 20 mass %.

Example 16

A binder, a conductive material paste composition for a secondary battery electrode, a slurry composition for a secondary battery electrode, an electrode (positive electrode) for a secondary battery, a negative electrode, and a secondary battery were produced in the same way as in Example 1 with the exception that a composite polymer (F-NF) obtained by the following production method was used as a fluorine-containing polymer in production of the binder instead of polyvinylidene fluoride (PVdF). Evaluations were conducted in the same manner as in Example 1. The results are shown in Table 1.

[[Production of Composite Polymer]]

The inside of an autoclave that had an internal capacity of approximately 6 L and included a magnetic stirrer was sufficiently purged with nitrogen. Thereafter, the autoclave was charged with 2.5 L of deoxygenated pure water and 25 g of ammonium perfluorodecanoate as an emulsifier, and was heated to 60° C. under stirring at 350 rpm. Next, the autoclave was charged with a mixed gas of 44.2% vinylidene fluoride (VdF) and 55.8% hexafluoropropylene (HFP) as fluorine-containing monomers until the internal pressure reached 20 kg/cm$^2$G. Thereafter, 25 g of a CFC-113 solution containing 20% of diisopropyl peroxydicarbonate as a polymerization initiator was introduced into the autoclave under pressure using nitrogen gas to initiate polymerization. During polymerization, a mixed gas of 60.2% VdF and 39.8% HFP was gradually introduced into the autoclave under pressure to maintain the pressure at 20 kg/cm$^2$G. Since the polymerization rate falls as polymerization proceeds, the same amount of polymerization initiator as previously introduced was introduced under pressure using nitrogen gas once 3 hours had passed and then the reaction was continued for a further 3 hours. Next, the reaction liquid was cooled, stirring was stopped, and then unreacted monomers were released to terminate the reaction and yield a latex of a fluorine-containing polymer including fluorine-containing monomer units.

The inside of a separable flask having a capacity of 7 L was then sufficiently purged with nitrogen. Thereafter, the separable flask was charged with 150 parts (in terms of solid content) of the fluorine-containing polymer latex obtained as described above and 3 parts of 2-(1-allyl)-4-nonylphenoxy-polyethylene glycol ammonium sulfate as an emulsifier, and was heated to 75° C. Next, 60 parts of butyl acrylate, 36 parts of methyl methacrylate, 2 parts of acrylic acid, 1 part of itaconic acid, and 1 part of N-methylolacrylamide as non-fluorine-containing monomers, and water as necessary, were added, and stirring was performed for 30 minutes at 75° C. Moreover, 0.5 parts of sodium persulfate was added as a polymerization initiator and polymerization was carried out for 2 hours at a temperature of 85° C. to 95° C. The reaction was subsequently terminated by cooling to yield an aqueous dispersion containing a composite polymer that was a composite of a fluorine-containing polymer with a non-fluorine-containing polymer.

Example 17

A binder, a conductive material paste composition for a secondary battery electrode, a slurry composition for a secondary battery electrode, an electrode (positive electrode) for a secondary battery, a negative electrode, and a secondary battery were produced in the same way as in Example 1 with the exception that an undercoating layer-equipped current collector for a secondary battery electrode formed by the following method was prepared instead of the current collector in production of the electrode (positive electrode) for a secondary battery. The percentage contents of alkylene structural units and nitrile group-containing monomer units in the first and second copolymers, the iodine values of the first and second copolymers, and the weight average molecular weights of the first and second copolymers were evaluated in the same way as in Example 1. The results are shown in Table 2.

Specifically, N-methylpyrrolidone (NMP) was added as a solvent to the water dispersion of the first copolymer (20 parts in terms of solid content) and the water dispersion of the second copolymer (3.5 parts in terms of solid content), and water was evaporated under reduced pressure to yield an NMP solution containing hydrogenated copolymer. An undercoating layer composition was then obtained by stirring 100 parts of the fibrous carbon nanomaterial, the obtained NMP solution, and an appropriate amount of NMP as a solvent using a disper blade (30 minutes at a rotation speed of 2,000 rpm).

Dispersibility of the fibrous carbon nanomaterial in the undercoating layer composition was evaluated as previously described. Moreover, the obtained undercoating layer composition was used to measure close adherence of an undercoating layer-equipped current collector as previously described. The results are shown in Table 2.

Next, aluminum foil of 12 μm in thickness was prepared as a current collector. The resultant undercoating layer composition was applied onto one surface of the aluminum foil by a comma coater such as to have a coating weight of 0.1 mg/cm$^2$, and was dried for 5 minutes at a temperature of 120° C. to form an undercoating layer-equipped current collector for a secondary battery electrode.

The output characteristics of a secondary battery including the undercoating layer-equipped current collector were evaluated in the same way as in Example 1. The results are shown in Table 2.

Comparative Example 1

A binder, a conductive material paste composition for a secondary battery electrode, a slurry composition for a secondary battery electrode, an electrode (positive electrode) for a secondary battery, a negative electrode, and a secondary battery were produced in the same way as in Example 1 with the exception that the amount of the fluorine-containing polymer used in production of the binder was changed to 23.5 parts, and the binder was produced without adding the water dispersion of the first copolymer and the water dispersion of the second copolymer. Evaluations were conducted in the same manner as in Example 1. The results are shown in Table 1.

Comparative Example 2

A binder, a conductive material paste composition for a secondary battery electrode, a slurry composition for a secondary battery electrode, an electrode (positive electrode) for a secondary battery, a negative electrode, and a secondary battery were produced in the same way as in Example 1 with the exception that the amount of the water dispersion of the second copolymer used in production of the binder was changed to 23.5 parts in terms of solid content, and the binder was produced without adding the water dispersion of the first copolymer and the fluorine-containing polymer. Evaluations were conducted in the same manner as in Example 1. The results are shown in Table 1.

Comparative Example 3

A binder, a conductive material paste composition for a secondary battery electrode, a slurry composition for a secondary battery electrode, an electrode (positive electrode) for a secondary battery, a negative electrode, and a secondary battery were produced in the same way as in Example 3 with the exception that a first copolymer (acrylonitrile monomer unit-containing copolymer) produced as described below was used as the first copolymer. Evaluations were conducted in the same manner as in Example 1. The results are shown in Table 1.

[[Production of First Copolymer]]

A polymerization vessel A was charged with 12 parts of 2-ethylhexyl acrylate, 2 parts of acrylonitrile (AN), 0.12 parts of sodium lauryl sulfate, and 79 parts of deionized water. Additionally, 0.2 parts of ammonium persulfate as a polymerization initiator and 10 parts of deionized water were added to the polymerization vessel A and were stirred for 90 minutes at 60° C.

A separate polymerization vessel B was charged with 58 parts of 2-ethylhexyl acrylate, 23 parts of acrylonitrile (AN), 5 parts of methacrylic acid, 0.7 parts of sodium lauryl sulfate, and 46 parts of deionized water, and was stirred to obtain an emulsion. Polymerization was carried out by gradually adding the emulsion from the polymerization vessel B to the polymerization vessel A over approximately 180 minutes. Thereafter, stirring was performed for approximately 120 minutes and cooling was performed once monomer consumption reached 95% to end the polymerization reaction. This reaction yielded a composition containing an acrylonitrile monomer unit-containing copolymer (AN).

In the acrylonitrile monomer unit-containing copolymer, the percentage content of (meth)acrylic acid ester monomer units was 77.6%, the percentage content of structural units of an acid component-containing vinyl monomer was 2.0%, the percentage content of (meth)acrylonitrile monomer units was 20.2%, and the percentage content of structural units of allyl methacrylate was 0.2%.

Next, the composition containing the acrylonitrile monomer unit-containing copolymer was adjusted to a pH of 8 through addition of sodium hydroxide aqueous solution of 5% in concentration. Unreacted monomers were removed by distillation under heating and reduced pressure, and then cooling was performed to 30° C. or lower. The cooled composition was diluted with deionized water to adjust the concentration to 40% and yield a water dispersion (aqueous AN) containing an acrylonitrile monomer unit-containing copolymer as a first copolymer.

The resultant first copolymer had a weight average molecular weight of 400,000.

Comparative Example 4

A binder, a conductive material paste composition for a secondary battery electrode, a slurry composition for a secondary battery electrode, an electrode (positive electrode) for a secondary battery, a negative electrode, and a secondary battery were produced in the same way as in Example 17 with the exception that in production of the NMP solution containing hydrogenated copolymer, the amount of the water dispersion of the second copolymer was changed to 23.5 parts in terms of solid content and the water dispersion of the first copolymer was not used.

Evaluations were conducted in the same manner as in Example 17. The results are shown in Table 2.

In Tables 1 and 2, shown below:
"CNTs" indicates carbon nanotubes;
"NBR" indicates copolymer including acrylonitrile and 1,3-butadiene;
"H-NBR" indicates hydrogenated product of copolymer including acrylonitrile and 1,3-butadiene;
"AN" indicates acrylonitrile monomer unit-containing copolymer;
"PVdF" indicates polyvinylidene fluoride; and
"F-NF" indicates composite polymer of fluorine-containing polymer composited with non-fluorine-containing polymer.

TABLE 1

| | | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
| Conductive material paste composition for secondary battery electrode | Conductive material | Amount of fibrous carbon nanomaterial (CNTs) [parts by mass] | 100 | 100 | 100 | 100 | 100 | 100 | 100 | 100 | 100 | 100 | 100 |
| | | Amount of other conductive material (graphite) [parts by mass] | — | — | — | — | — | — | — | — | — | — | — |
| | | Percentage content of fibrous carbon nanomaterial in conductive material [mass %] | 100 | 100 | 100 | 100 | 100 | 100 | 100 | 100 | 100 | 100 | 100 |
| | Binder | First copolymer | Type | H-NBR | H-NBR | H-NBR | H-NBR | H-NBR | H-NBR | H-NBR | H-NBR | H-NBR | H-NBR | H-NBR |
| | | | Weight average molecular weight [10³] | 400 | 400 | 400 | 400 | 400 | 400 | 200 | 600 | 400 | 400 | 400 |
| | | | Percentage content of alkylene structural units [mass %] | 65 | 65 | 65 | 65 | 80 | 65 | 65 | 65 | 65 | 65 | 65 |
| | | | Percentage content of nitrile group-containing monomer units [mass %] | 35 | 35 | 35 | 35 | 20 | 35 | 35 | 35 | 35 | 35 | 35 |
| | | | Percentage content of other repeating units [mass %] | — | — | — | — | — | — | — | — | — | — | — |
| | | | Iodine value [mg/100 mg] | 20 | 20 | 20 | 20 | 2 | 60 | 20 | 20 | 20 | 20 | 20 |
| | | | Amount [parts by mass] | 10 | 20 | 23.5 | 13.5 | 10 | 10 | 10 | 10 | 7 | 11.6 | 5 |
| | | | Percentage content of alkylene structural units [mass %] | 80 | 80 | — | — | 80 | 80 | 30 | 100 | 80 | 80 | 80 |
| | | | [mass %] | 65 | 65 | — | — | 65 | 65 | 65 | 65 | 65 | 65 | 65 |
| | | Second copolymer (H-NBR) | Percentage content of alkylene structural units [mass %] | 35 | 35 | — | — | 35 | 35 | 35 | 35 | 35 | 35 | 35 |
| | | | Percentage content of nitrile group-containing monomer units [mass %] | — | — | — | — | — | — | — | — | — | — | — |
| | | | Percentage content of other repeating units [mass %] | — | — | — | — | — | — | — | — | — | — | — |
| | | | Iodine value [mg/100 mg] | 20 | 20 | 20 | — | 20 | 20 | 20 | 20 | 20 | 20 | 20 |
| | | | Amount [parts by mass] | 3.5 | 3.5 | — | — | 3.5 | 3.5 | 3.5 | 3.5 | 9.5 | 0.3 | 1.7 |
| | | | Percentage content in entire binder [mass %] | 14.9 | 14.9 | — | — | 14.9 | 14.9 | 14.9 | 14.9 | 40.4 | 1.3 | 14.5 |
| | | Fluorine-containing polymer | Type | PVdF | — | — | PVdF | PVdF | PVdF | PVdF | PVdF | PVdF | PVdF | PVdF |
| | | | Weight average molecular weight [10³] | 1000 | — | — | 1000 | 1000 | 1000 | 1000 | 1000 | 1000 | 1000 | 1000 |
| | | | Amount [parts by mass] | 10 | — | — | 10 | 10 | 10 | 10 | 10 | 7 | 11.6 | 5 |
| | | Compounding ratio of entire binder [times vs. CNTs] | | 0.235 | 0.235 | 0.235 | 0.235 | 0.235 | 0.235 | 0.235 | 0.235 | 0.235 | 0.235 | 0.117 |
| Evaluation | Fibrous carbon nanomaterial dispersibility in slurry composition | | A | A | C | C | A | A | A | B | A | B | B |
| | Close adherence of electrode (peel strength) | | A | A | A | A | B | A | B | A | B | A | B |
| | Secondary battery output characteristics | | A | B | B | A | A | A | B | B | B | B | A |
| | Secondary battery capacity storage stability | | A | A | A | A | A | B | A | A | A | A | B |

TABLE 1-continued

|  |  |  |  | Example 12 | Example 13 | Example 14 | Example 15 | Example 16 | Comparative Example 1 | Comparative Example 2 | Comparative Example 3 |
|---|---|---|---|---|---|---|---|---|---|---|---|
| Conductive material paste composition for secondary battery electrode | Conductive material | | Amount of fibrous carbon nanomaterial (CNTs) [parts by mass] | 100 | 70 | 50 | 100 | 100 | 100 | 100 | 100 |
| | | | Amount of other conductive material (graphite) [parts by mass] | — | 30 | 50 | — | — | — | — | — |
| | | | Percentage content of fibrous carbon nanomaterial in conductive material [mass %] | 100 | 70 | 50 | 100 | 100 | 100 | 100 | 100 |
| | Binder | First copolymer | Type | H-NBR | H-NBR | H-NBR | H-NBR | H-NBR | — | — | Aqueous AN |
| | | | Weight average molecular weight [10³] | 400 | 400 | 400 | 400 | 400 | | | 400 |
| | | | Percentage content of alkylene structural units [mass %] | 65 | 65 | 65 | 60 | 65 | | | — |
| | | | Percentage content of nitrile group-containing monomer units [mass %] | 35 | 35 | 35 | 20 | 35 | | | — |
| | | | Percentage content of other repeating units [mass %] | — | — | — | 20 | — | | | — |
| | | | Iodine value [mg/100 mg] | 20 | 20 | 20 | 20 | 20 | | | 23.5 |
| | | | Amount [parts by mass] | 20 | 20 | 20 | 20 | 20 | | | — |
| | | Second copolymer (H-NBR) | Weight average molecular weight [10³] | 80 | 80 | 80 | 80 | 80 | | 80 | |
| | | | Percentage content of alkylene structural units [mass %] | 65 | 65 | 65 | 60 | 65 | | 65 | |
| | | | Percentage content of nitrile group-containing monomer units [mass %] | 35 | 35 | 35 | 20 | 35 | | 35 | |
| | | | Percentage content of other repeating units [mass %] | — | — | — | 20 | — | | — | |
| | | | Iodine value [mg/100 mg] | 20 | 20 | 20 | 20 | 20 | | 20 | |
| | | | Amount [parts by mass] | 7 | 3.5 | 3.5 | 3.5 | 3.5 | | 23.5 | |
| | | | Percentage content in entire binder [mass %] | 14.9 | 14.9 | 14.9 | 14.9 | 14.9 | | 100 | |
| | | Fluorine-containing polymer | Type | PVdF | PVdF | PVdF | PVdF | F-NF | PVdF | — | — |
| | | | Weight average molecular weight [10³] | 1000 | 1000 | 1000 | 1000 | 600 | 1000 | | |
| | | | Amount [parts by mass] | 20 | 10 | 10 | 10 | 10 | 23.5 | | |
| | | Compounding ratio of entire binder [times vs. CNTs] | | 0.47 | 0.235 | 0.235 | 0.235 | 0.235 | 0.235 | 0.235 | 0.235 |
| Evaluation | Fibrous carbon nanomaterial dispersibility in slurry composition | | | A | A | A | B | B | E | — | E |
| | Close adherence of electrode (peel strength) | | | A | A | A | B | B | A | C | B |
| | Secondary battery output characteristics | | | B | B | C | A | A | A | A | D |
| | Secondary battery capacity storage stability | | | A | B | B | A | A | A | C | D |

TABLE 2

|  |  |  |  | Example 17 | Comparative Example 4 |
|---|---|---|---|---|---|
| Undercoating layer for secondary battery electrode | Conductive material |  | Amount of fibrous carbon nanomaterial (CNTs) [parts by mass] | 100 | 100 |
|  |  |  | Amount of other conductive material (graphite) [parts by mass] | — | — |
|  |  |  | Percentage content of fibrous carbon nanomaterial in conductive material [mass %] | 100 | 100 |
|  | Binder | First copolymer | Type | H-NBR | — |
|  |  |  | Weight average molecular weight [$10^3$] | 400 |  |
|  |  |  | Percentage content of alkylene structural units [mass %] | 65 |  |
|  |  |  | Percentage content of nitrile group-containing monomer units [mass %] | 35 |  |
|  |  |  | Percentage content of other repeating units [mass %] | — |  |
|  |  |  | Iodine value [mg/100 mg] | 20 |  |
|  |  |  | Amount [parts by mass] | 20 |  |
|  |  | Second copolymer (H-NBR) | Weight average molecular weight [$10^3$] | 80 | 80 |
|  |  |  | Percentage content of alkylene structural units [mass %] | 65 | 65 |
|  |  |  | Percentage content of nitrile group-containing monomer units [mass %] | 35 | 35 |
|  |  |  | Percentage content of other repeating units [mass %] | — | — |
|  |  |  | Iodine value [mg/100 mg] | 20 | 20 |
|  |  |  | Amount [parts by mass] | 3.5 | 23.5 |
|  |  |  | Percentage content in entire binder [mass %] | 14.9 | 100 |
|  |  | Fluorine-containing polymer | Type | — | — |
|  |  |  | Weight average molecular weight [$10^3$] |  |  |
|  |  |  | Amount [parts by mass] |  |  |
|  |  | Compounding ratio of entire binder [times vs. CNTs] |  | 0.235 | 0.235 |
| Evaluation |  | Fibrous carbon nanomaterial dispersibility in undercoating layer composition |  | A | A |
|  |  | Close adherence of undercoating layer-equipped current collector (peel strength) |  | A | D |
|  |  | Secondary battery output characteristics |  | A | C |

It can be seen from Table 1 that in the slurry compositions for secondary battery electrodes of Examples 1 to 16, which were each produced using a conductive material paste composition for a secondary battery electrode containing a binder that included a first copolymer including an alkylene structural unit and a nitrile group-containing monomer unit and having a weight average molecular weight of at least 170,000 and less than 1,500,000, it was possible to favorably disperse a fibrous carbon nanomaterial as a conductive material compared to in the slurry compositions for secondary battery electrodes of Comparative Examples 1 and 3, which were each produced using a conductive material paste composition that did not contain a copolymer including an alkylene structural unit and a nitrile group-containing monomer unit.

Moreover, it can be seen that for the slurry composition of Comparative Example 2, which was produced using a conductive material paste composition that only included a copolymer having a weight average molecular weight of less than 170,000, electrode peel strength decreased compared to for the slurry compositions of Examples 1 to 16.

This demonstrates that by producing a slurry composition for a secondary battery electrode using a conductive material paste composition for a secondary battery electrode that contains a first copolymer including an alkylene structural unit and a nitrile group-containing monomer unit and having a weight average molecular weight of at least 170,000 and less than 1,500,000, it is possible to achieve both high fibrous carbon nanomaterial dispersibility and high close adherence of a produced electrode.

Moreover, it can be seen from Table 2 that in the case of the electrode for a secondary battery of Example 17, which included an undercoating layer-equipped current collector for a secondary battery electrode containing a first copolymer, electrode close adherence was improved and a secondary battery in which the electrode was used had better output characteristics compared to the electrode for a secondary battery of Comparative Example 4, which included an undercoating layer-equipped current collector that did not contain a first copolymer.

INDUSTRIAL APPLICABILITY

According to this disclosure, it is possible to provide a slurry composition in which a fibrous carbon nanomaterial is favorably dispersed and with which an electrode mixed material layer having excellent close adherence to a current collector can be formed.

Moreover, according to this disclosure, it is possible to provide an undercoating layer-equipped current collector for a secondary battery electrode that can be used to provide an electrode for a secondary battery having excellent close adherence between a current collector and an electrode mixed material layer formed on the current collector.

The invention claimed is:

1. A conductive material paste composition for a secondary battery electrode comprising:
a fibrous carbon nanomaterial;
a binder; and
a solvent, wherein
the binder includes a first hydrogenated nitrile butadiene rubber including an alkylene structural unit and a nitrile group-containing monomer unit and having a weight average molecular weight of at least 200,000 and less than 500,000, a second hydrogenated nitrile butadiene rubber including an alkylene structural unit and a nitrile group-containing monomer unit and having a weight average molecular weight of at least 30,000 and less than 100,000, and
the second hydrogenated nitrile butadiene rubber is contained in proportion of 0.02 times or more and 0.09 times or less relative to a content of the fibrous carbon nanomaterial.

2. The conductive material paste composition for a secondary battery electrode according to claim 1, wherein
the second hydrogenated nitrile butadiene rubber is contained in a proportion of at least 0.5 mass % and less than 50 mass % relative to total content of the binder.

3. The conductive material paste composition for a secondary battery electrode according to claim 2, wherein
the binder further includes a fluorine-containing polymer.

4. The conductive material paste composition for a secondary battery electrode according to claim 2, wherein
the fibrous carbon nanomaterial is one or more carbon nanotubes.

5. The conductive material paste composition for a secondary battery electrode according to claim 1, wherein
the binder further includes a fluorine-containing polymer.

6. The conductive material paste composition for a secondary battery electrode according to claim 1, wherein
the fibrous carbon nanomaterial is one or more carbon nanotubes.

7. The conductive material paste composition for a secondary battery electrode according to claim 1, wherein the first hydrogenated nitrile butadiene rubber is contained in proportion of at least 0.01 times or more and 0.4 times or less relative to a content of the fibrous carbon nanomaterial.

8. The conductive material paste composition for a secondary battery electrode according to claim 1, wherein an iodine value of the first hydrogenated nitrile butadiene rubber is 3 mg/100 mg or more and 60 mg/100 mg or less, and an iodine value of the second hydrogenated nitrile butadiene rubber is 3 mg/100 mg or more and 60 mg/100 mg or less.

9. The conductive material paste composition for a secondary battery electrode according to claim 1, wherein
the first hydrogenated nitrile butadiene rubber includes the nitrile group-containing monomer unit in a proportion of not less than 25 mass %, and
the binder further includes a fluorine-containing polymer having a weight average molecular weight of not less than 1,000,000.

10. A slurry composition for a secondary battery electrode comprising:
an electrode active material; and
the conductive material paste composition for a secondary battery electrode according to claim 1.

11. An electrode for a secondary battery comprising:
a current collector; and
an electrode mixed material layer formed using the slurry composition for a secondary battery electrode according to claim 10.

12. A secondary battery comprising the electrode for a secondary battery according to claim 11.

13. An undercoating layer-equipped current collector for a secondary battery electrode comprising:
a current collector; and
an undercoating layer on at least one surface of the current collector, wherein
the undercoating layer contains a fibrous carbon nanomaterial and a binder, and
the binder includes a first hydrogenated nitrile butadiene rubber including an alkylene structural unit and a nitrile group-containing monomer unit and having a weight average molecular weight of at least 200,000 d less than 500,000, a second hydrogenated nitrile butadiene rubber including an alkylene structural unit and a nitrile group-containing monomer unit and having a weight average molecular weight of at least 30,000 and less than 100,000, and
the second hydrogenated nitrile butadiene rubber is contained in proportion of 0.02 times or more and 0.09 times or less relative to a content of the fibrous carbon nanomaterial.

14. The undercoating layer-equipped current collector for a secondary battery electrode according to claim 13, wherein
the second hydrogenated nitrile butadiene rubber is contained in a proportion of at least 0.5 mass % and less than 50 mass % relative to total content of the binder.

15. The undercoating layer-equipped current collector for a secondary battery electrode according to claim 14, wherein
the fibrous carbon nanomaterial is one or more carbon nanotubes.

16. The undercoating layer-equipped current collector for a secondary battery electrode according to claim 13, wherein
the fibrous carbon nanomaterial is one or more carbon nanotubes.

* * * * *